United States Patent
Shi

(10) Patent No.: US 11,535,780 B2
(45) Date of Patent: Dec. 27, 2022

(54) BIOLOGICALLY-DERIVED DEICER

(71) Applicant: Washington State University, Pullman, WA (US)

(72) Inventor: Xianming Shi, Pullman, WA (US)

(73) Assignee: WASHINGTON STATE UNIVERSITY, Pullman, WA (US)

(*) Notice: Subject to any disclaimer, the term of this patent is extended or adjusted under 35 U.S.C. 154(b) by 40 days.

(21) Appl. No.: 17/173,080

(22) Filed: Feb. 10, 2021

(65) Prior Publication Data
US 2021/0253923 A1     Aug. 19, 2021

Related U.S. Application Data

(60) Provisional application No. 62/972,142, filed on Feb. 10, 2020.

(51) Int. Cl.
*C09K 3/18*     (2006.01)

(52) U.S. Cl.
CPC .................................. *C09K 3/185* (2013.01)

(58) Field of Classification Search
CPC .................................. C09K 3/18; C09K 3/185
See application file for complete search history.

(56) References Cited

U.S. PATENT DOCUMENTS

| | | | | |
|---|---|---|---|---|
| 4,664,832 A | * | 5/1987 | Sandvig | C09K 3/185 162/16 |
| 8,440,095 B1 | * | 5/2013 | Kharshan | C23F 11/08 106/14.44 |
| 2014/0103249 A1 | * | 4/2014 | Pylkkanen | C09K 3/18 252/70 |

* cited by examiner

*Primary Examiner* — Anthony J Green
(74) *Attorney, Agent, or Firm* — Christensen O'Connor Johnson Kindness PLLC

(57) ABSTRACT

A deicing formulation, comprising a chemically degraded extract derived from biowaste; and a salt is provided. Methods for preventing ice formation or removing ice from a surface by applying the deicing formula made of chemically degraded extract derived from biowaste and a salt to the surface are also provided.

17 Claims, 27 Drawing Sheets

BIOLOGICALLY-DERIVED DEICER

CROSS-REFERENCE TO RELATED APPLICATION

This application claims the benefit of U.S. Provisional Application No. 62/972,142, filed Feb. 10, 2020, the disclosure of which is hereby expressly incorporated by reference in its entirety.

STATEMENT OF GOVERNMENT LICENSE RIGHTS

This invention was made with Government support under Grant No. 1638384, awarded by the National Science Foundation; and Grant No. DTRT13-G-UTC49, awarded by the U.S. Department of Transportation. The Government has certain rights in the invention

BACKGROUND

Winter maintenance agencies are looking for better ways to ensure safe and reliable roads during wintery weather in terms of cost-effectiveness and environmental stewardship. The U.S. spends approximately $2.3 billion each year to keep highways free of snow and ice, and the highway winter maintenance operations cause considerable damages to infrastructure and the natural environment and add at least $5 billion to this cost. Roadway deicers contain mainly chloride salts, which are the most common freezing point depressants used for snow/ice control operations. The chloride salts are persistent in the environment, posing a significant risk to infrastructure, motor vehicles, and the natural environment over time. Presently, about 27 million tons of NaCl salt is used for winter maintenance of roadways in the U.S. annually.

In order to balance the environmental risks associated with using snow and ice control products with the values they provide, sustainability principles need to be better incorporated into the winter maintenance operations of highways. Relative to sanding and deicing, a practice that can improve the level of service on pavement and reduce the amount of applied chemicals is needed. This can lead to cost savings and benefits in safety and mobility. Similar to deicers, there are some concerns over commercial anti-icers, including their corrosivity toward metals, impacts on asphalt and concrete, and toxicity to aquatic species, etc.

Bio-based deicers have been introduced to tackle the negative effects of chloride-based deicers and improve their performance. However, there are gaps in the studies related to these materials. Many of these studies do not report the constituents of the bio-based materials that they have used. This makes it nearly impossible for other researchers to repeat the experiments using similar compounds. Some studies use commercial bio-based products with some unknown compounds, and other studies used either raw bio-based materials (e.g., beet juice), waste of industrial processes (e.g., desugared molasses), or commercial organic chemicals. These may work effectively for winter road maintenance operations, but can induce acute impacts to the receiving environment, particularly due to potential toxicological effects and high oxygen demand of the organic compounds. Yet another factor rarely investigated is the effect of aging on the performance of bio-based materials.

Glycerol, which is a byproduct of biodiesel production, has been widely used in deicing and anti-icing formulations. However, glycerol mixtures are very viscous, and if diluted can be used for anti-icing; but the dilution will compromise their effectiveness for snow/ice control. In addition, glycerol can negatively affect water quality, which limits its allowable concentration in the anti-icer. De-sugared molasses, an inexpensive byproduct of sugar beet root, has been used as an effective and renewable additive for deicing and anti-icing applications. Yet, at high additive rates, it can reduce the ice melting capacity, but it also poses a significant risk to receiving water with increased oxygen demand.

Because of this, there is an urgent need to introduce more eco-friendly materials for winter road maintenance operations along with a more comprehensive evaluation of the multiple aspects of agro-based additives and formulations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a deicing formulation, made from a chemically degraded extract derived from biowaste and a salt is disclosed.

In another aspect, a method of preventing ice formation or removing ice from a surface, comprising applying the deicing formulation is disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
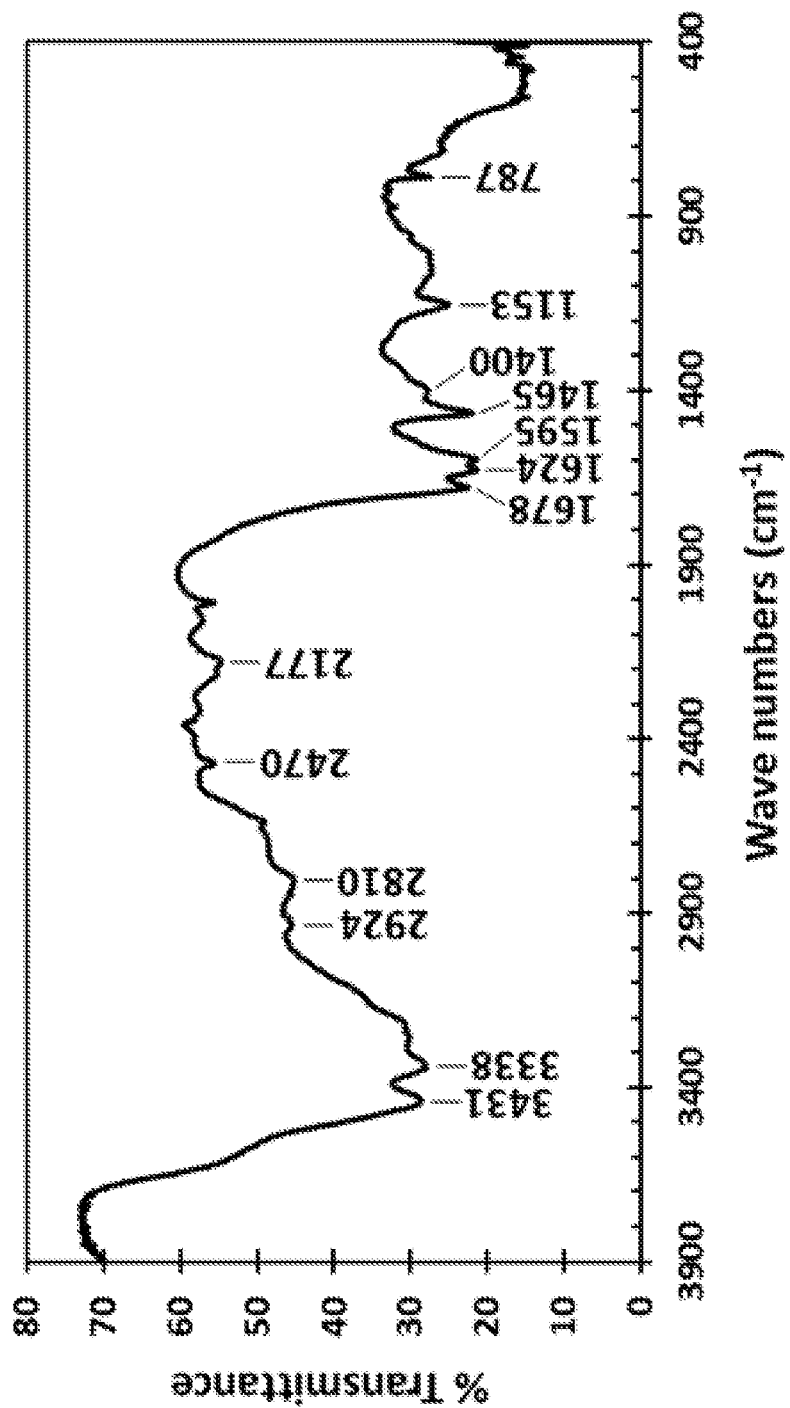
FIG. 1 is an FTIR spectrum of an example dandelion leaf extract in accordance with the present technology.

The present technology demonstrates deicing formulations made of chemically degraded extract derived from biowaste, as well as methods of using the deicing formulations for deicing. The deicing formulations can be derived from biological waste streams (e.g., unused plant parts). Notable applications include using the deicing formulations for deicing surfaces such as roads, parking lots, and pedestrian surfaces.

Deicing Formulations

In one aspect, a deicing formulation, made from a chemically degraded extract derived from biowaste and a salt is disclosed. The formulation is for "deicing" or is a "deicer." As used herein, these terms refer generally to a composition that provides any antagonistic action against ice or snow. Analogous terms include anti-icing and pre-wetting.

As used herein, "biowaste" and "biologically derived" are broad terms that cover any organic material, and particularly plant material. Plant material that is not traditionally useful (e.g., waste) is of particular interest due to the inexpensive nature of such feedstocks and the possibility of rendering waste streams useful. However, it will be appreciated that non-waste biological feedstocks are also useful in certain embodiments.

In some embodiments, the biowaste is waste leaves of flowers; vegetation; vegetables; shrubs; pomace, rind or skin of fruits; and combinations thereof. In some embodiments, combinations of biowastes may be used. In some embodiments, the extract of any number of flower leaves such as peony, tulip, rose, and daffodil leaves may be synthesized. In some embodiments, vegetation such as Kentucky bluegrass, sugarcane bagasse, crop residues, corn stover, wheat straw, barley, oats, rice straw, millet, and sorghum extracts may be synthesized. In another embodiment, vegetables such as potato and squash may be used. In yet another embodiment, pomace, rind, or skin of fruits such as grape, apple, pear, tomato, cherries, berries, citrus fruits, melons, and/or pineapple may provide the extract.

The biowaste is used to produce a "chemically degraded extract." As used herein, "chemically degraded" refers to any chemical or biological process that transforms the biowaste and degrades the biowaste material into smaller molecules (i.e., lower molecular weight than the starting materials). Chemical and biological degradation can be used in combination, as set forth in the examples.

In some embodiments, the chemically degraded extract is chemically degraded using a degradant selected from urea, NaOH, KOH, LiOH, bacteria, fungus, and combinations thereof. In some embodiments, the extract is chemically degraded by cold temperature, at −15±5° C. or colder, and urea in an alkaline solution for quick dissolution of cellulose and then further biologically at room temperature using bacteria or fungi. In some embodiments, the bacteria is *Bacillus Megaterium* or similar species in the Bacillaceae bacteria family. In some embodiments, chemical degradation includes two steps: first chemical (e.g., urea) degradation and then biological degradation.

In some embodiments, the chemically derived extract derived from biowaste has a molecular structure of $C_XH_YO_ZP_UN_V$, where the number of C atoms (X), H atoms (Y), O atoms (Z), P atoms (U), and N atoms (V) falls in the ranges of 4 to 42, 5 to 63, 2 to 15, 0 to 1, and 0 to 8, respectively. In some embodiments, the extract contains a mixture of organic phosphates, amides and amines, the specific composition of which can be determined from the combined use of Fourier transformed infrared) Spectrometer (FTIR) and Liquid chromatography-mass spectrometry (LC-MS). In particular, the chemically derived extract includes molecules of relatively low molecular weight, due to the biowaste material being degraded from its original molecular sizes.

In some embodiments, the chemically degraded extract derived from biowaste is present in the deicing formulation in an amount from 0.5-16%, by weight. In a further embodiment, the biowaste is present in the amount of 0.9 to 10% by weight. In yet a further embodiment, the biowaste is present in the amount of 1 to 8% by weight.

The deicing formulation also includes a salt. The salt can be any salt useful for deicing purposes. Many are known to those of skill in the art.

In some embodiments, the salt is a chloride salt, such as NaCl, KCl, $MgCl_2$ or $CaCl_2$.

In some embodiments, the salt is NaCl or KCl and is present in an amount from 5-25%%, by weight; or the salt is $MgCl_2$ or $CaCl_2$ and is present in an amount from 0-10%.

In some embodiments, the salt in the deicer mixture is a chloride salt. In some embodiments, such as the one described in the example, the chloride salt is NaCl. In other embodiments, the chloride salt is $MgCl_2$, $CaCl_2$, KCl, or any combination thereof.

In some embodiments, the salt is NaCl or KCl and is present in an amount from 5-25%, by weight. In a further embodiment, NaCl or KCl is present in an amount from 10 to 23% by weight. In yet a further embodiment, NaCl or KCl is present in an amount from 16 to 23% by weight. In some embodiments, the salt is $MgCl_2$ or $CaCl_2$ and is present in an amount from 0-10%. In a further embodiment, $MgCl_2$ or $CaCl_2$ is present in an amount from 1 to 5%, by weight.

In some embodiments, the deicer formulation further includes an additive selected from the group of sodium metasilicate, sodium formate, calcium formate, sodium acetate, potassium acetate, calcium magnesium acetate, glycerin, erythritol, xylitol, sodium gluconate, sodium succinate, potassium gluconate, potassium succinate, xanthan gum, and combinations thereof. These constituents further help improve the snow and ice control performance of the liquid formulation, reduce its corrosiveness to metals, and mitigate its negative impacts on concrete and asphalt materials. In some embodiments, the additive is present in an amount from 0-7%, by weight. In a more preferred embodiment, the additive is present in an amount from 0 to 6% by weight. In a most preferred embodiment, the additive is present in an amount from 0.1 to 4.5% by weight.

In some embodiments, the deicing formulation further includes an additive selected from the group of sodium metasilicate, sodium formate, calcium formate, sodium acetate, potassium acetate, calcium magnesium acetate, glycerin, erythritol, xylitol, sodium gluconate, sodium succinate, potassium gluconate, potassium succinate, xanthan gum, and combinations thereof. In some embodiments, the additive is present in an amount from 0-7%, by weight.

In some embodiments, that deicing formulation is in liquid form. Such a form can be sprayed or otherwise applied directly to a surface to be deiced or to prewet or otherwise prepare other forms of deicing or snow/ice treatment materials. In some embodiments, the liquid deicing formulation includes water or liquid waste from distillery industries, such as the "head" and "tail" water waste from barley vodka distilleries. In some embodiments, the liquid deicing formulation is configured to pre-wet a solid surface. In some embodiments, the solid surface is a solid deicer. In other embodiments, the solid surface is a solid salt, traction abrasive, transportation surface for vehicles, transportation surface for pedestrians, or the like. In some embodiments, the surface is a traction abrasive such as sand and/or gravel. In some embodiments, the surface is a transportation surface such as roads and parking lots. In some embodiments, the surface is for pedestrians such as places for walking, bikes, scooters, stairs, etc.

In some embodiments, the final product may take another form, such as a solid.

In some embodiments, the deicing formulation may prevent ice formation or removing ice from a surface, when the deicing formulation is applied to a surface. In some embodiments, the deicing formulation is applied in a liquid deicing formulation. In some embodiments, the liquid deicing formulation is used to prewet the surface. The surface may solid deicer, solid salt, traction abrasive, a transportation surface for vehicles, and/or a transportation surface for pedestrians such as those described previously.

In some embodiments, the liquid deicing formulation may be used to prevent a bond of snow and ice; break a bond between compacted snow and ice with a solid surface; reducing the likelihood of snow being compacted into hard-to-remove conditions; reduce the bounce-and-scatter, and/or speed up the action of winter traction salt or sand; and combinations thereof. In some embodiments, the liquid deicer is used to prevent any bond of snow and ice (a.k.a., anti-icing). In some embodiments, the formulation is used to break the bond between compacted snow and ice with a solid surface (a.k.a., deicing) and increase the likelihood of snow being compacted. In other embodiments. The formulation is used to reduce the bounce-and-scatter and speed up the action of winter traction salt or sand (a.k.a., pre-wetting). In some embodiments. The formulation may be used for multiple functions at once.

Methods of Using the Deicing Formulations

The deicing formulations described herein can be applied to surfaces to prevent ice from forming, assist in removing ice, or otherwise disrupt the matrix of snow and ice.

Accordingly, in another aspect, a method of preventing ice formation or removing ice from a surface, comprising applying the deicing formulation is disclosed. Any of the deicing formulations disclosed herein are compatible with the methods of the present aspect.

In some embodiments, the deicing formulation is applied in a liquid deicing formulation.

In some embodiments, the liquid deicing formulation is configured to prewet the surface.

In some embodiments, the surface is a solid deicer, solid salt, traction abrasive, a transportation surface for vehicles, and a transportation surface for pedestrians.

In some embodiments, the biowaste of the chemically degraded extract derived from biowaste is selected from the group of waste leaves of flowers; vegetation; vegetables; shrubs; pomace, rind or skin of fruits; and combinations thereof. In some embodiments, the salt is a chloride salt.

EXAMPLES

Example 1: Dandelion Leaf and Sugar Beet Leaf

Below, an analysis of dandelion leaf and sugar beet leaf extract and their abilities as anti-icers are described.

To minimize the number of required tests for studying a large variety of parameters, a statistical Uniform Design (UD) of experiments was used. The UD scheme used the parameters of $X_1$, $X_2$, $X_3$, and $X_4$ as the weight percent (wt. %) of dandelion extract, sugar beet leaf extract, sodium metasilicate, and sodium formate, respectively. The wt. % range of 0-3 was chosen for $X_1$ and $X_2$, and 0-2 for $X_3$ and $X_4$. Sixteen anti-icer mixtures were examined, as shown in Table 7.

Dried dandelion leaf and sugar beet leaf (dryness ~91%) were obtained from the Western Agricultural Research Center in Montana, USA with the following characteristics: European dandelion, *Taraxacum officinale*, aged 30 days at harvest, material aged 1 year at use; Sugar beet, *Beta vulgaris* L., aged 175 days at harvest, material aged 1 year at use. The leaf was ground into fine powders with the size ≤37 μm (Mesh 400) and further processed with chemical degradation. The chemical degradation was designed based on the knowledge that cold NaOH/urea aqueous solutions are capable of dissolving cellulose relatively rapidly. The process began by mixing 120 g urea, 0.5 g $Ca(OH)_2$ and 200 mL deionized water (DI water). Then 30 g of leaf powder were added to the mixture. The pH was adjusted above 10.5 by adding the appropriate amount of NaOH. This mixture was stirred vigorously for 30 min, and then it was placed in the freezer until a slurry of ice and liquid formed (about −13° C.). Subsequent to the chemical degradation, the biological degradation was designed to further break down the dissolved cellulose, semi-cellulose, lignin, etc. in the solution. The process began by stirring the mixture vigorously while adding 0.5 L DI water to it simultaneously. Then, the pH of the solution was adjusted at about 8.5 by adding $HNO_3$ and NaOH. In the next step, a mixture of 1.12 g $KH_2PO_4$, 1.932 g $NaH_2PO_4.H_2O$, and 0.16 g $MgSO_4.7H_2O$ was added to the solution. Finally, 100 mL of *Bacillus Megaterium* bacteria (NRRL B-14308) was added to the solution, which was subsequently placed in a shaker for 14 days for aerobic biodegradation of the mixture.

The final product was a liquid extract. The liquid mixture provides comparable or better performance than the 23 wt. % NaCl solution (a.k.a., salt brine) commonly used for anti-icing, direct liquid deicing, or pre-wetting of solid salt or abrasives for snow and ice control, while introducing less chloride ions into the surrounding environment and posing less corrosive risks to motor vehicles, steel bridges, concrete and asphalt infrastructure. It also provides comparable or better performance than the blend of salt brine: beet juice (80/20 vol./vol.), the commonly used "green" alternative to salt brine, while posing less risks to aquatic species and water bodies receiving stormwater from pavements in cold climates, due to its lower biochemical and chemical oxygen demands.

The concentration of the final product was 224.5 g solid material/1 L liquid extract. This concentration calculated by drying of the extract at room temperature. In the case of oven drying at 103° C. for 24 h, the measured concentration was 114.5 g/L. It is noteworthy that in this work the waste leaf of sugar beet, instead of its root, was used as the feedstock.

It should be mentioned that in this research the waste leaf of sugar beet was used as the feedstock for preparing the extract. This extract thus differs greatly from the beet juice often used by highway agencies to blend with salt brine, where the beet juice was obtained from the root of sugar beet.

For calculating the weight percent of each compound, the surface area below the peak associated with that compound was measured using ImageJ software. Then the weight percent of the compound was determined by calculating the percentage area of each compound. A Milwaukee MW100 portable pH meter with 0.1 pH resolution was used for measuring the pH of samples.

The chemical functional groups of the sugar beet leaf extract and dandelion leaf extract were determined using a Nicolet iS50 FTIR (Fourier transformed infrared) Spectrometer from Thermo Scientific. The IR spectra was collected over the wave number range of 4000-400 $cm^{-1}$. Prior the test, the extract samples were uniformly mixed with FTIR grade of potassium bromide KBr.

FIG. 1 is an FTIR spectrum of an example dandelion leaf extract in accordance with the present technology. On the horizontal axis is the Wave number. On the vertical axis is percent Transmittance. The suggested functional groups are given in Table 1

TABLE 1

Chemical functional groups of dandelion leaf extract.

| Wave number ($cm^{-1}$) | Functional group | Bond | Frequency range ($cm^{-1}$) |
| --- | --- | --- | --- |
| 3431 and 3338 | 1°, 2° amines and amides | N—H stretch | 3400-3250 |
| 2924 | alkanes | C—H bend | 3000-2850 |
| 2810 | carboxylic acids | O—H stretch | 3300-2500 |
| 2470 | ketones | O—H stretch | 3400-2400 |
| 2177 | alkynes | —C≡C— stretch | 2260-2100 |
| 1678 | alkenes | —C═C— stretch | 1680-1640 |
| 1624 and 1595 | 1° amines | N—H bend | 1650-1580 |
| 1465 | alkanes | C—H bend | 1470-1450 |
| 1400 | aromatics | C—C stretch (in-ring) | 1500-1400 |
| 1153 | aliphatic amines | C—N stretch | 1250-1020 |
| 787 | alkenes | ═C—H bend | 1000-650 |

Figure 2:
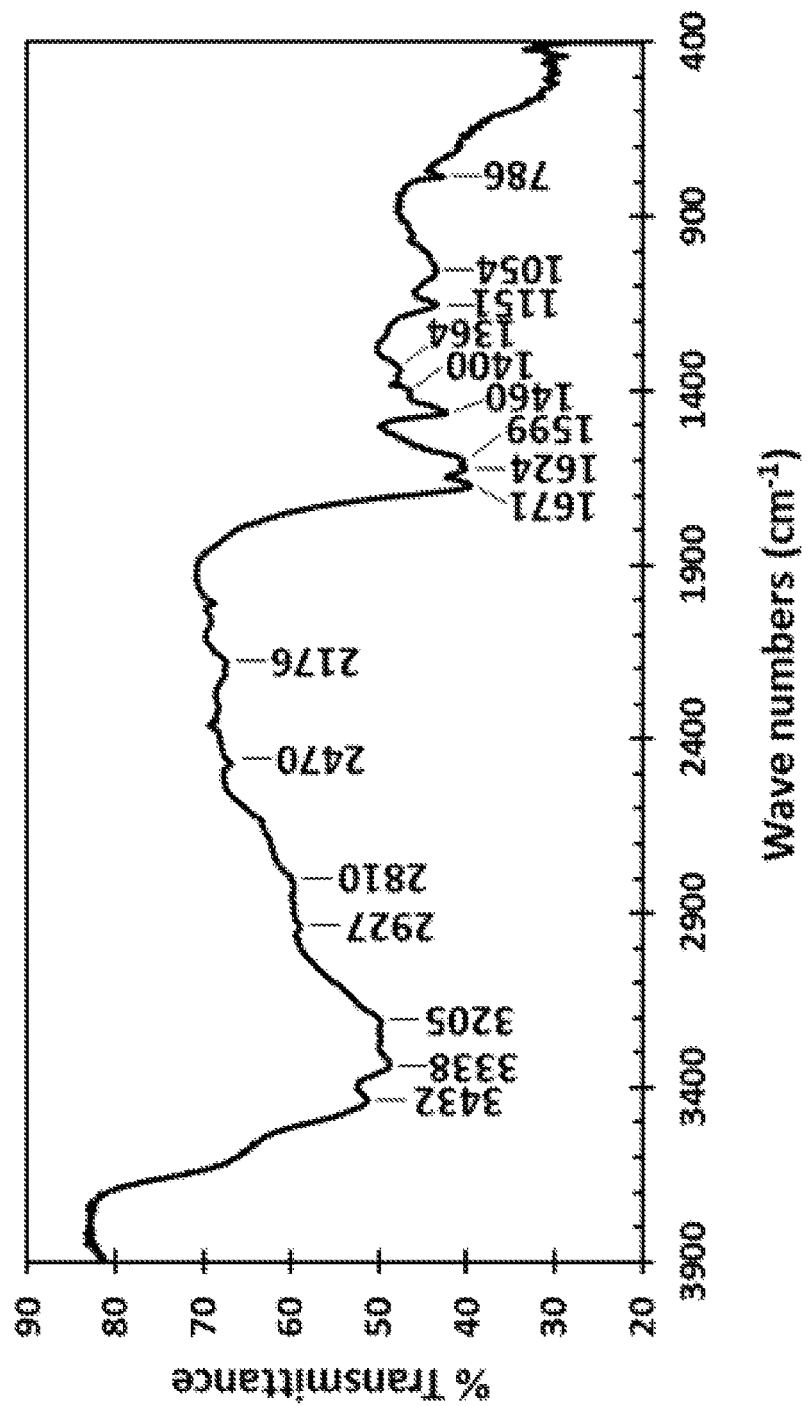
FIG. 2 is an FTIR spectrum of an example sugar beet leaf extract in accordance with the present technology.

FIG. 2 is an FTIR spectrum of an example sugar beet leaf extract in accordance with the present technology. On the horizontal axis is the Wave number. On the vertical axis is the percent Transmittance. The suggested functional groups are given in Table 2.

TABLE 2

Chemical functional groups of sugar beet leaf extract.

| Wave number ($cm^{-1}$) | Functional group | Bond | Frequency range ($cm^{-1}$) |
| --- | --- | --- | --- |
| 3432 and 3338 | 1°, 2° amines and amides | N—H stretch | 3400-3250 |
| 3205 | carboxylic acids | O—H stretch | 3300-2500 |
| 2927 | alkanes | C—H bend | 3000-2850 |
| 2810 | carboxylic acids | O—H stretch | 3300-2500 |
| 2470 | ketones | O—H stretch | 3400-2400 |
| 2176 | alkynes | —C≡C—stretch | 2260-2100 |
| 1671 | alkenes | —C═C—stretch | 1680-1640 |
| 1624 and 1599 | 1° amines | N—H bend | 1650-1580 |
| 1460 | alkanes | C—H bend C—C stretch (in-ring) | 1470-1450 |
| 1400 | aromatics | | 1500-1400 |
| 1364 | alkanes | C—H rock | 1370-1350 |
| 1151 | aliphatic amines | C—N stretch | 1250-1020 |
| 786 | alkenes | ═C—H bend | 1000-650 |

The results show that the extracts may be composed of the following functional groups: 1° and 2° amines, amides, alkanes, carboxylic acids, ketones, alkynes, alkenes, aromatics, and aliphatic amines. These functional groups feature the organic chemicals made of C, H, N, and O.

Liquid chromatography-mass spectrometry (LC-MS) method was employed for analysis of extracts out of the sugar beet leaf and dandelion leaf extracts, respectively. LC-MS was carried out by a quadrupole time-of-flight mass spectrometer (Synapt G2-S) in the positive ion mode. The Progenesis QI v. 2.0.5542 software (Nonlinear Dynamics) was used for interpretation of the data. It corrected the accurate masses to the LockMass (LeuEnk, m/z 556.2771 for positive ion mode) and performed the peak alignment and integration using all isotopes belonging to a compound ion. Using Progenesis, the possible elemental compositions were calculated and the external search of the Chemspider database was conducted, considering the following elements: C, H, N, O, P, Na, Ca, Cl, K, and S. All of these elements were derived from EDS results, except hydrogen. Hydrogen was added to this list because of the application of the hydrogen-containing compounds in the preparation of the plant extracts and considering the fact that hydrogen can be found in natural products. Since the wt. % of Si in dandelion extract was below 1%, it was not considered in the process of the interpretation of LC-MS results. In this work, based on the elemental analysis more elements than previous research for interpretation of LC-MS results were considered. This explains why more compounds or sometimes even different compounds were detected in the sugar beet leaf extract compared to what reported in previous work.

Figure 3:
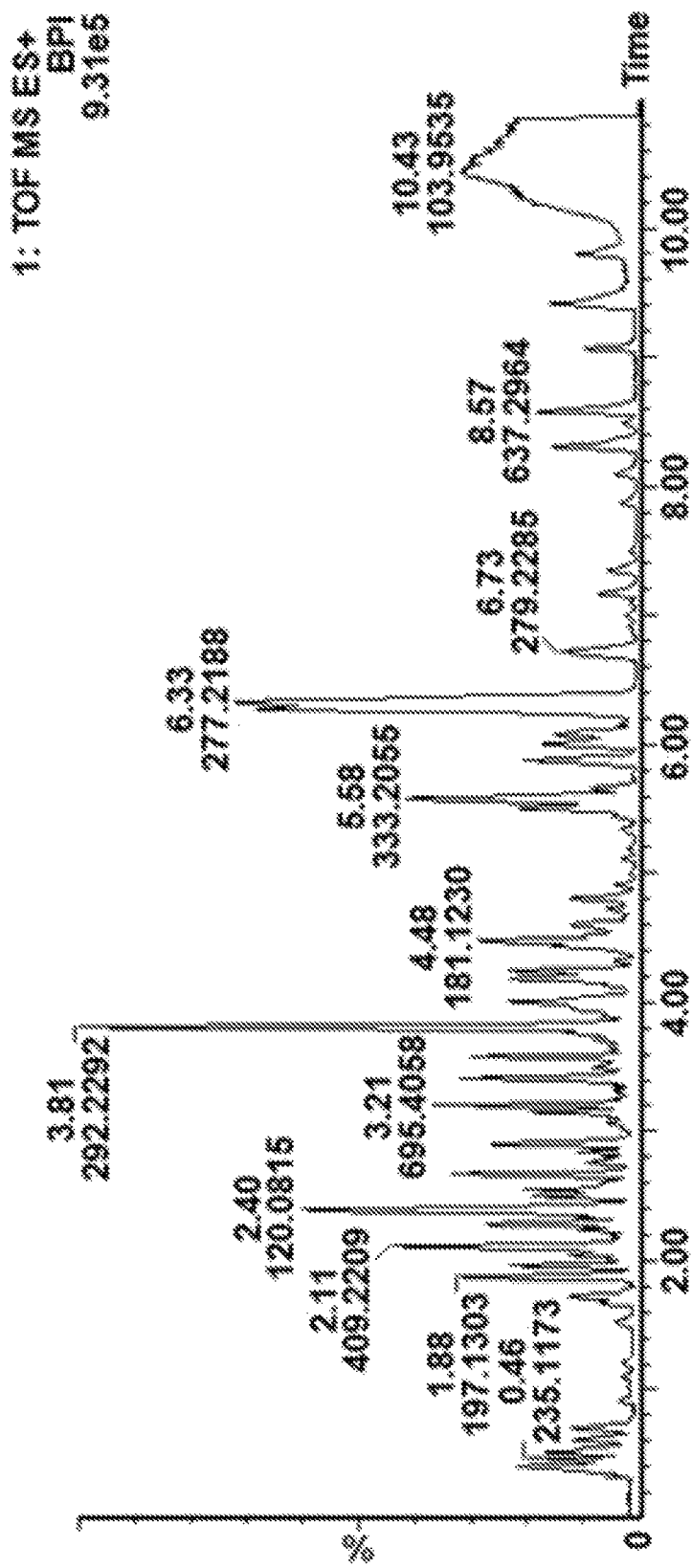
FIG. 3 is an LC-MS spectrum of an example dandelion leaf extract in accordance with the present technology.

FIG. 3 is an LC-MS analysis of an example dandelion leaf extract in accordance with the present technology. On the horizontal axis is time. On the vertical axis is percentage. The proposed chemical compounds for the extracts are presented in Table 3

TABLE 3

Chemicals observed in dandelion leaf extract by LC-MS method.

| Formula | Retention time (mm) | m/z | Wt. % |
|---|---|---|---|
| $C_{11}H_{14}N_4O_2$ | 0.46 | 235.1173 | 1.2 |
| $C_{13}H_{17}Na$ | 1.88 | 197.1303 | 4.8 |
| $C_{18}H_{38}N_2O_2P_2S$ | 2.11 | 409.2209 | 6.9 |
| $C_8H_{10}N$ | 2.40 | 120.0815 | 12.1 |
| $C_{34}H_{59}N_2NaO_{11}$ | 3.21 | 695.4058 | 4.2 |
| $C_{18}H_{30}NO_2$ | 3.81 | 292.2292 | 20.3 |
| $C_{11}H_{17}O_2^-$ | 4.48 | 181.1230 | 6.9 |
| $C_{16}H_{29}KN_4O$ | 5.58 | 333.2055 | 9.2 |
| $C_{18}H_{28}O_2$ | 6.33 | 277.2188 | 28.6 |
| $C_{18}H_{30}O_2$ | 6.73 | 279.2285 | 3.1 |
| $C_{28}H_{45}N_4NaO_{11}$ | 8.57 | 637.2964 | 2.7 |

Figure 4:
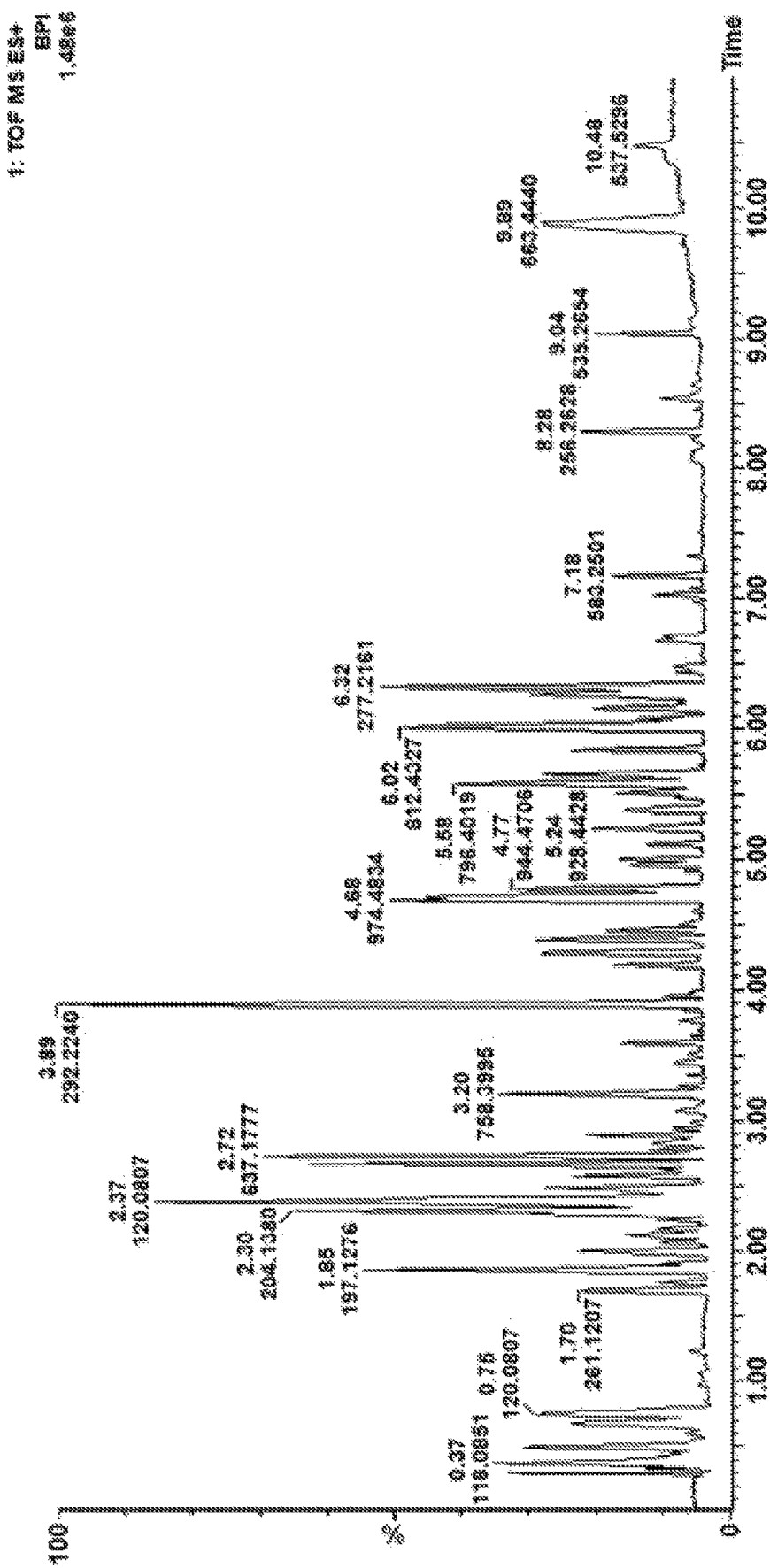
FIG. 4 is an LC-MS spectrum of an example sugar beet leaf extract in accordance with the present technology.

FIG. 4 is an LC-MS analysis of an example sugar beet leaf extract in accordance with the present technology. On the horizontal axis is time. On the vertical axis is percentage. The proposed chemical compounds for the extracts are presented in Table 4.

TABLE 4

Chemicals observed in sugar beet leaf extract by LC-MS method.

| Formula | Retention time (mm) | m/z | Wt. % |
|---|---|---|---|
| $C_6H_{15}NO$ | 0.37 | 118.0851 | 5.5 |
| $C_{13}H_{17}N_4P$ | 1.70 | 261.1207 | 2.7 |
| $C_{13}H_{17}Na$ | 1.85 | 197.1276 | 6.6 |
| $C_{13}H_{18}NO$ | 2.30 | 204.1380 | 7.3 |
| $C_8H_{10}N^+$ | 2.37 | 120.0807 | 11.3 |
| $C_{26}H_{37}O_{16}P$ | 2.72 | 637.1777 | 8.2 |
| $C_{18}H_{29}NO_2$ | 3.89 | 292.2240 | 12.8 |
| $C_{41}H_{71}N_{11}O_{14}S$ | 4.68 | 974.4834 | 8.9 |
| $C_{45}H_{74}N_3O_{16}P$ | 4.77 | 944.4706 | 3.9 |
| $C_{42}H_{71}N_3NaO_{16}P$ | 5.24 | 928.4428 | 1.9 |
| $C_{37}H_{63}N_3NaO_{12}P$ | 5.58 | 796.4019 | 4.2 |
| $C_{38}H_{67}N_3NaO_{12}P$ | 6.02 | 812.4327 | 8.7 |
| $C_{18}H_{28}O_2$ | 6.32 | 277.2161 | 6.6 |
| $C_{33}H_{34}N_4O_6$ | 7.18 | 583.2501 | 1.4 |
| $C_{16}H_{33}NO$ | 8.28 | 256.2628 | 2.0 |
| $C_{28}H_{39}N_4NaO_3S$ | 9.04 | 535.2654 | 1.6 |
| $C_{42}H_{63}O_4P$ | 9.89 | 663.4440 | 5.9 |
| $C_{23}H_{50}N_2NaO_8P$ | 10.48 | 537.5296 | 0.5 |

Based on LC-MS results, extracts are made out of O, C, H, N, P, Na, and S. This is in good agreement with elemental analysis and FTIR results. The organic compounds containing heteroatoms such as oxygen, nitrogen, sulfur, and phosphorous have a polar structure and can be spontaneously adsorbed onto the metallic surfaces.

The concentration of phenol in each extract was measured via a spectrophotometric method. For preparation of the samples, 1 mL of methanolic solution of extract with concentration of 1 mg/mL was mixed with 5 mL of 10% Folin-Ciocalteu's reagent dissolved in water and 5 mL of 7.5% $NaHCO_3$ solution dissolved in water. The blank sample consisted of 1 mL methanol, 5 mL 10% Folin-Ciocalteu's reagent dissolved in water and 5 mL of 7.5% of $NaHCO_3$ solution. The samples were incubated at 45° C. for 1 hour. Then, the absorbance was measured using a Genesys 20 visible spectrophotometer at $\lambda_{max}$ of 765 nm. The tests were triplicated to ensure statistical reliability. The same procedure was used for the standard solutions of Gallic acid for making the calibration line and the following equation was obtained: $y=0.0076x+0.1823$, $R^2=0.9578$; in which y is the absorbance and x is the concentration of Gallic acid. The concentration of phenol was calculated in µg/mL unit based on the measured absorbance values and the calibration line. Finally, the concentration of phenol in the extract was expressed in terms of Gallic acid equivalent (µg of GA/g of extract). Elemental analysis of the sugar beet leaf extract and dandelion leaf extract was determined by energy dispersive spectroscopy (EDS) method using a Apreo VolumeScope™ SEM instrument equipped with a TEAM™ Pegasus integrated EDS-EBSD (Electron Backscatter Diffraction) system at an accelerating voltage of 20 kV. The EDS results are presented in Table 5.

TABLE 5

Elemental analysis of the extracts obtained by EDS technique.

| Type of extract | Weight percent (wt. %) of element | | | | | | | | | |
|---|---|---|---|---|---|---|---|---|---|---|
| | C | N | O | Na | Si | P | S | Cl | K | Ca |
| Dandelion leaf | 17.74 | 20.99 | 29.49 | 5.55 | 0.60 | 6.18 | 3.48 | 3.62 | 8.42 | 3.92 |
| Sugar beet leaf | 26.45 | 40.10 | 23.58 | 0.82 | — | 4.73 | — | 1.15 | 3.16 | — |

According to the FTIR results (as shown in FIG. 1 and FIG. 2), both sugar beet leaf and dandelion leaf extracts contain amines and amides. Amides and long-chain amines have ice melting properties. Therefore, it can be concluded that the ice melting ability of sugar beet leaf and dandelion leaf extracts is may be due to the existence of amides and amines in their compounds. In addition, based on the LC-MS results (as shown in FIG. 3 and FIG. 4), sugar beet leaf extract contains $C_{42}H_{63}O_4P$. The possible structures for this compound are Tris[2,4-bis(2-methylpropyl)phenyl] phosphate or Tris[4-(1,1,3,3-tetramethylbutyl)phenyl] phosphate or Tris(2,4-ditert-butylphenyl)phosphate. As it can be seen, all of these possible structures contain phosphate ion, so, it can be concluded that phosphate is one of the sugar beet leaf extract components. Phosphates are deicing compounds. Therefore, sugar beet leaf extract contains one more deicing component compared to dandelion leaf extract. This can be the reason of more pronounced effect of sugar beet leaf extract on IMC. The positive effect of sugar beet extract on IMC value observed in this research is in good agreement with the authors' previously published results and the other researchers' results that showed the blend of NaCl, bio-based materials and other proprietaries can outperform NaCl brine.

The concentration of flavonoids in each extract was determined using a spectrophotometric method. The test sample was consisted of 5 mL of 1 mg/mL methanolic solution of the extract and 5 mL of 2% $AlCl_3$ methanolic solution. The incubation of samples was done for two hours at room temperature. The absorbance was determined using a Genesys 20 visible spectrophotometer at $\lambda_{max}$ of 415 nm. The tests were triplicated to ensure statistical reliability. The same procedure was performed for the standard solutions of Rutin for making the calibration line and the following equation was obtained: y=0.0226x+0.1118, $R^2$=0.9821; in which y is the absorbance and x is the concentration of Rutil. The concentration of flavonoids was calculated in mg/mL unit based on the measured absorbance values and the calibration line. Then, the concentration of flavonoids in the extract was expressed in terms of Gallic acid equivalent (µg of RU/g of extract).

The total phenol and flavonoids contents of the sugar beet leaf extract and dandelion leaf extracts are presented in Table 6.

TABLE 6

Total phenol and flavonoids contents of sugar beet leaf extract and dandelion leaf extract.

| Sample | Total phenol (pg of GA/g of extract) | Total flavonoids (µg of RU/g of extract) |
|---|---|---|
| Dandelion leaf extract | 43.21 | 7.53 |
| Sugar beet leaf extract | 42.97 | 10.26 |

According to Table 6, both phenol and flavonoids contents of the extracts are in the level of micro grams which shows low level of these components in the extracts. Since these components are usually available in the plants and plant extracts in the level of mg/g, the low concentration of them in the extracts, µg/g, may show that most of the phenol and flavonoids of the sugar beet leaf and dandelion leaf are degraded in the degradation process.

Figure 5:
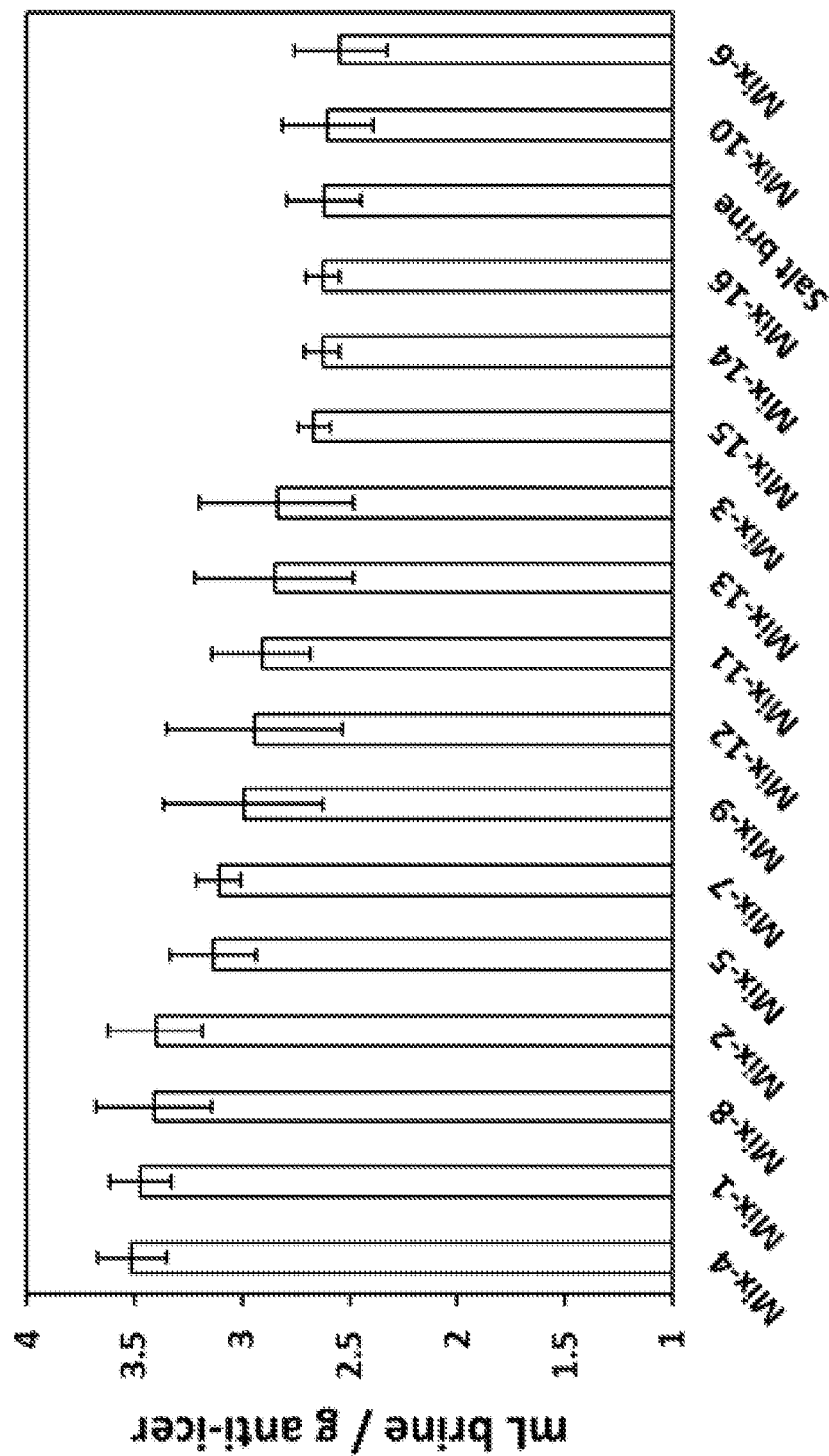
FIG. 5 is a graph of the 60-minute ice-melting capacities (IMCs) of various example anti-icer solutions in accordance with the present technology.

FIG. 5 is a graph of the 60-minute ice-melting capacities (IMCs) of various example anti-icer solutions in accordance with the present technology. On the horizontal axis is various anti-icer mixtures. On the vertical axis is the mL of brine to grams of anti-icer. To make the anti-icer mixtures mentioned in Table 7, rock salt, dandelion leaf extract, sugar beet leaf extract, reagent-grades sodium formate and metasilicate, and deionized water were used. Each mixture had 23 wt. % rock salt, different amounts of the extracts, and sodium metasilicate and formate determined by using the UD table.

TABLE 7

Experimental design for anti-icer solutions based on uniform design method.

| Sample | Weight percent of each compound (wt. %) | | | | | |
|---|---|---|---|---|---|---|
| | Dandelion leaf extract | Sugar beet leaf extract | Sodium metasilicate | Sodium formate | Sodium chloride | Water |
| Mix 1 | 0 | 3 | 0 | 0.67 | 23 | 73.33 |
| Mix 2 | 1 | 3 | 2 | 1.34 | 23 | 69.66 |
| Mix 3 | 2 | 1 | 0 | 0 | 23 | 74 |
| Mix 4 | 3 | 3 | 1.34 | 0 | 23 | 69.66 |
| Mix 5 | 0 | 0 | 2 | 0 | 23 | 75 |
| Mix 6 | 1 | 0 | 0 | 2 | 23 | 74 |
| Mix 7 | 3 | 1 | 2 | 2 | 23 | 69 |
| Mix 8 | 3 | 2 | 0 | 2 | 23 | 70 |
| Mix 9 | 2 | 2 | 2 | 0.67 | 23 | 70.33 |
| Mix 10 | 0 | 1 | 0.67 | 1.34 | 23 | 73.99 |
| Mix 11 | 2 | 3 | 0.67 | 2 | 23 | 69.33 |
| Mix 12 | 1 | 2 | 0.67 | 0 | 23 | 73.33 |
| Mix 13 | 3 | 0 | 0.67 | 0.67 | 23 | 72.66 |
| Mix 14 | 0 | 2 | 1.34 | 2 | 23 | 71.66 |
| Mix 15 | 2 | 0 | 1.34 | 1.34 | 23 | 72.32 |
| Mix 16 | 1 | 1 | 1.34 | 0.67 | 23 | 72.99 |
| Control (salt brine) | 0 | 0 | 0 | 0 | 23 | 77 |

For measuring the ice melted by anti-icer mixtures over time, a modified Strategic Highway Research Program (SHRP) ice-melting test (H-205.1 and H-205.2) was used. In this test, 48 mL DI water was used for making the ice in a 150×20 mm polystyrene petri dish. Then, 1.4 mL anti-icer mixture was applied over the ice at −3.9° C. After 10, 20, 30, 45, and 60 min, the volume of melted ice was measured with a syringe and it was returned to the ice sample evenly. For each measurement, the ice sample was removed from the freezer for about 30 s, and then was returned to the freezer. The tests were triplicated to ensure statistical reliability.

The impact of anti-icer formulations on the durability of Portland cement mortar (PCM) was evaluated via SHRP H205.8 freeze-thaw (F-T) cyclic test method with minor modifications. This method assesses the combined effects of anti-icer solutions and F-T cycling on the structural integrity of PCM samples. The samples were made in 5.1 cm (diameter)×10.2 cm (length) molds. Mortar mixture design was based on the sand-to-cement and water-to-cement ratios of 3:1 and 1:2, respectively, with 1.5 mL water reducer. Portland cement type I-II and Sakrete multipurpose sand were used. They were cured for 24 h in water before being placed in sealed plastic boxes with 100% relative humidity for 28 days. Then the dry weights of the samples were measured before placing them in dishes, equipped with a sponge in their bottom, holding 310 mL of 3% anti-icer liquid. The dishes were sealed with plastic wrap to prevent evaporation. Two mortar samples were placed in each dish and diluted 23% NaCl brine (i.e., a blend of 23% NaCl brine and DI water at 3:97 mass ratio) was used as the control. Using a thermocouple placed in the control PCM sample, temperature was monitored during freeze-thaw test cycling. Dishes were moved to plastic boxes which were kept at −20.8±0.2° C. for 16 to 18 h then at 23.2±0.2° C. for 6 to 8 h. In the freeze-thaw cycle, the cooling and heating rates were 0.06° C./min and 0.07° C./min, respectively. F-T cycles were continued for 10 days. Then the scaled-off materials were removed from samples and they were air-dried overnight before recording the final weight.

The average 60 min ice-melting capacities (IMCs) of anti-icer solutions at −3.9° C. are shown in FIG. 5. All of the mixtures show an ice melting capacity of 90% or more than the capacity of salt brine, which has been identified by some of the researchers as the lowest acceptable performance for an alternative anti-icer. Therefore, all of them have the potential to be used instead of 23% NaCl. There was little difference (<0.3 mL/g) between the ice-melting capacity of NaCl brine and mixtures 3, 11, and 13-16. On the other hand, Mixes 1, 2, 4, 5, 7-9, and 12 had an ice-melting capacity of at least 0.3 mL/g (12 percent) more than NaCl brine, which make them potential anti-icers for replacing the salt brine.

In the next step, Fisher's least significant difference (LSD) method was used for statistically comparing the means to make it clear which formula is different from salt brine with statistical significance. The results of LSD analysis including the parameter of "p" and the mean differences of the IMC of control (salt brine) with that of each sample are presented in Table 8. In this table, when p is less than 0.05 then the mean difference of IMC is statistically significant. It is seen that the mean differences for samples 1, 2, 4, and 8 are statistically significant (p<0.05).

TABLE 8

Significance of the differences of means (p) for different mixtures

| Control vs. Mix # | Mean difference+ | p |
|---|---|---|
| 1 | −0.85000* | 0.017 |
| 2 | −0.78000* | 0.027 |
| 3 | −0.21933 | 0.521 |
| 4 | −0.89167* | 0.013 |
| 5 | −0.51600 | 0.136 |
| 6 | 0.07667 | 0.822 |
| 7 | −0.48600 | 0.160 |
| 8 | −0.78867* | 0.026 |
| 9 | −0.37233 | 0.278 |
| 10 | 0.01667 | 0.961 |
| 11 | −0.29000 | 0.397 |
| 12 | −0.32267 | 0.347 |
| 13 | −0.23067 | 0.500 |
| 14 | −0.00700 | 0.984 |
| 15 | −0.04567 | 0.893 |
| 16 | −0.00467 | 0.989 |

+Mean difference = IMCcontrol − IMCsample
*The mean difference is signficant at the 0.05 level.

Based on the multivariate linear regression analysis on the ice melting data for all 17 samples, it became clear that among the 4 variables of sugar beet leaf extract, dandelion leaf extract, sodium formate, and sodium metasilicate, the sugar beet leaf extract has a statistically significant positive effect (coefficient=0.181 and p=0.001<0.05). This effect is interesting and noteworthy. On the other hand, the dandelion extract (coefficient=0.082 and p=0.125>0.05) and formate (coefficient=−0.102 and p=0.182>0.05) had a marginal effect on IMC. Silicate (coefficient=0.041 and p=0.601>>0.05) appears to have no significant effect on IMC.

Figure 6:
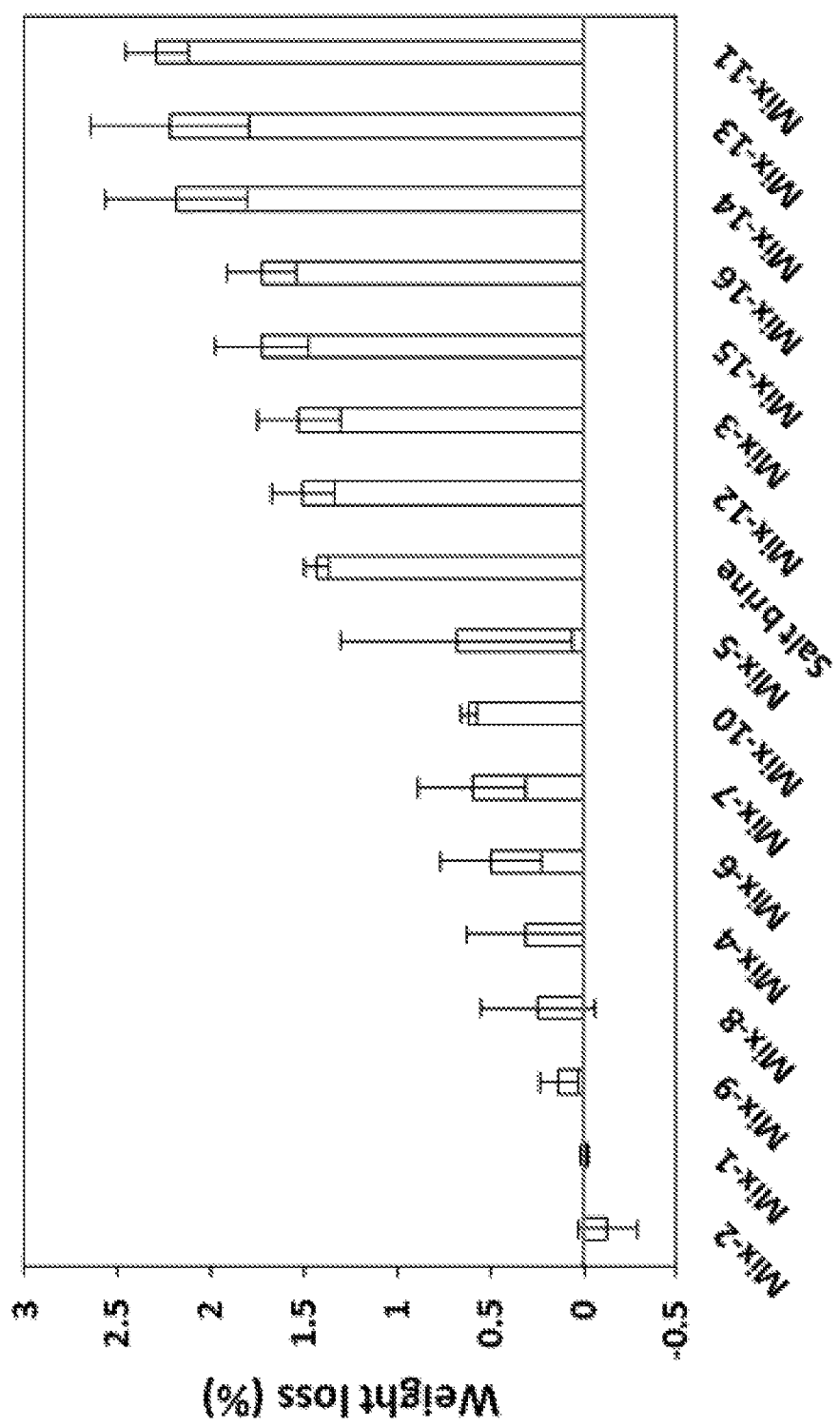
FIG. 6 is a graph of the mass loss of example Portland cement mortar (PCM) samples exposed to anti-icer solutions in accordance with the present technology.

FIG. 6 is a graph of the mass loss of example Portland cement mortar (PCM) samples exposed to anti-icer solutions in accordance with the present technology. On the horizontal axis is various anti-icer mixtures. On the vertical axis is the weight loss in percent. FIG. 6 illustrates the mass loss of PCM samples exposed to anti-icer solutions after 10-day freeze-thaw test. Mixes 3, 11, and 13-16 show the highest impact to PCM and are approximately equivalent in terms of impact toward mortar. However, Mixes 1, 2, and 4-10 show lower detrimental impact towards PCM than plain salt brine and the other formulas, which is desirable. The results of LSD analysis shows that the mean differences of mass loss between control and samples 1, 2, 4, 6-9, and 11 are statistically significant. Therefore, it can be concluded that mixtures 1, 2, 4, and 6-9 have statistically lower impacts on control compared to other samples.

The impact of deicers on mortar samples can be ascribed to the combination of physical and chemical attacks which undermine the integrity and the strength of mortar. The physical attack is mostly caused by freezing/thawing cycles, and can have different symptoms such as scaling, map cracking, and paste disintegration. Salts can cause scaling of the cementitious materials through osmotic pressure, precipitation and growth of salt crystals, thermal shock, and glue spalling. On the other hand, the chemical attack can be in the form of chemical reactions of deicers with cement paste and aggregate phase which can weaken the cementitious materials. For instance, Portlandite [$Ca(OH)_2$] may react with deicer ions which can cause formation of expansive oxychloride compounds. The rate of reactions depends on the diffusion coefficient of chloride ions. Usually it takes less than 3 hours for chloride ions to penetrate to the depth of 300 μm in a concrete sample and reach equilibrium.

Based on the regression analysis on all data, it was revealed that the beet extract has the most obvious effect (coefficient=−0.215 and p=0.119). There does appear to be a relationship between lower PCM mass loss with higher beet extract content, though the effect is not statistically significant at p<0.05. In addition, it appears that the effect of dandelion extract is clearly insignificant (coefficient=0.038 and p=0.782>0.05). Silicate appears to have a very slight beneficial effect on scaling reduction (coefficient=−0.136 and p=0.500), and formate appears to have a very slight effect to make scaling worse (coefficient=0.038 and p=0.843), however these effects are not statistically significant at p<0.05.

Based on the FTIR and LC-MS results (shown above), the sugar beet leaf extract contains both amines and phosphates, and dandelion extract contains only amines. The molecules containing amines and phosphates in the extracts may be active ingredients that increased the resistance of mortar samples against deicer-scaling damage.

Figure 7:
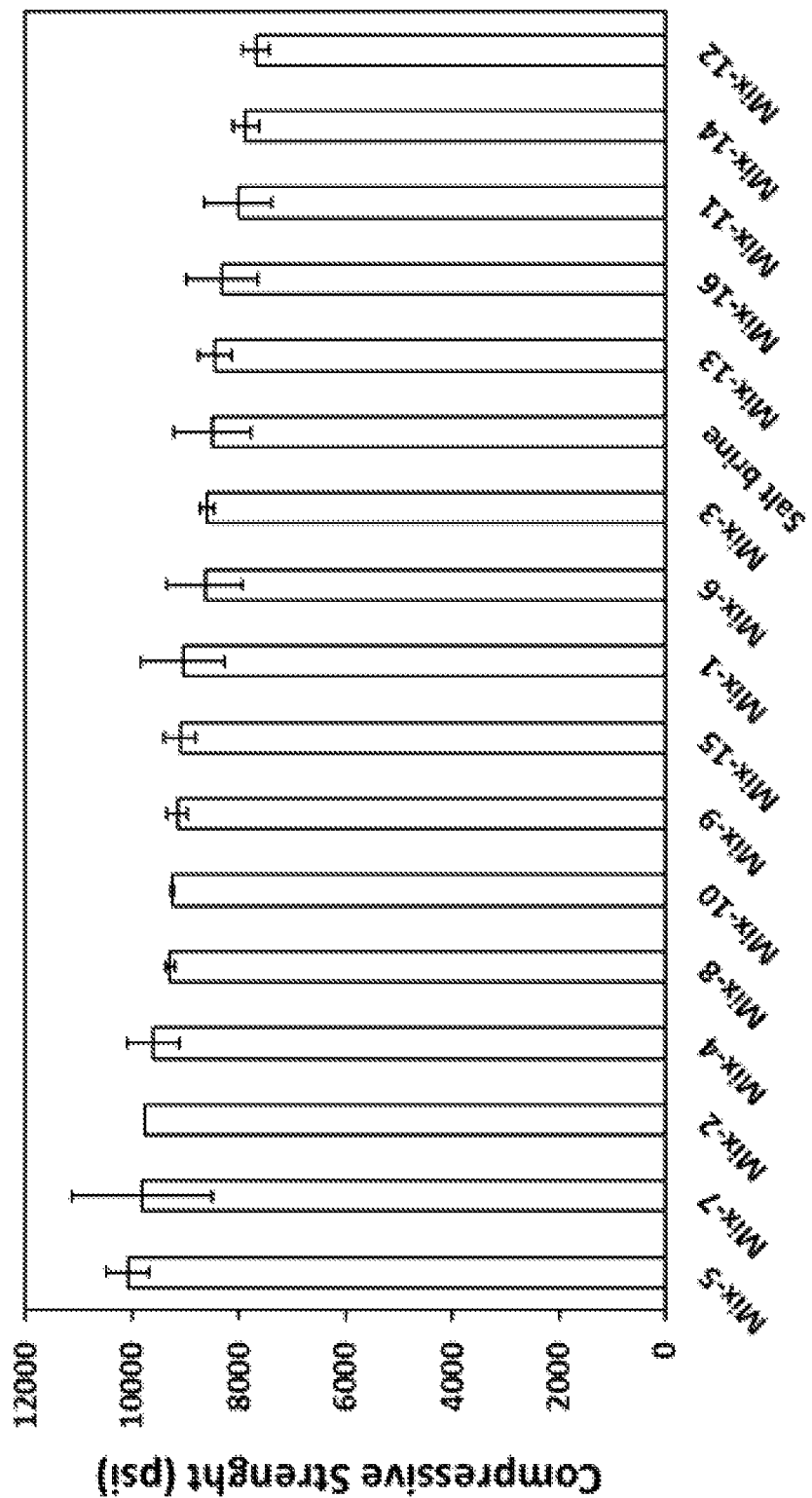
FIG. 7 is a graph of the average compressive strength of example PCM samples when exposed to different anti-icer solutions in accordance with the present technology.

FIG. 7 is a graph of the average compressive strength of example PCM samples when exposed to different anti-icer solutions in accordance with the present technology. On the horizontal axis is various anti-icer mixtures. On the vertical axis is compressive strength. The average compressive strength of the mortar samples exposed to different anti-icer solutions after 10-cycle freeze-thaw (F-T) testing is shown in FIG. 7. It can be seen that there is no noticeable relationship between the mass loss results (as shown in FIG. 6) and the compression test results. For example, the least average mass loss belongs to Mix 2, but the maximum compressive strength is associated with Mix 5. The compressive strength is more affected by frost damage rather than scaling damage. Frost damage is mainly due to the osmotic pressure. Since in this research the PCM samples are non-air-entrained, they are more susceptible to this damage.

The results of regression analysis of all 17 samples suggest that silicate has a strong beneficial effect on compressive strength (coefficient=412.992 and p=0.048), which is statistically significant at p<0.05. Silicate phase reacts with concrete and produces crystalline CSH phase which can improve the mechanical properties of concrete samples. On the other hand, it appears that dandelion extract does not have any significant beneficial effect on compressive strength (coefficient=80.194 and p=0.556). In addition, formate and beet extract, with coefficients of −38.790 and −38.279, respectively, and p values equal or more than 0.777, do not have any significant negative effect on compressive strength. In addition, LSD analysis on compressive strength results showed no sample has a significant mean difference with control.

So, based on the aforementioned observations and the results of previous section, it can be suggested that sugar beet leaf extract appears to reduce F-T scaling of PCM in the formulas, but similar to dandelion leaf extract, it has no significant effect on compressive strength.

Low temperature behavior of asphalt binder (PG 64-28 from Western States Asphalt, Inc.) was studied using a bending beam rheometer (BBR) at −18° C. To simulate field conditions of short-term aging (during construction) and long-term aging (during first ten years of service), the binder was aged in the laboratory using a rolling thin-film oven (RTFO) and pressure-aging vessel (PAV), respectively. Then 10 mL of anti-icer solution was added to each 30 g of the aged binder. Finally, the mix was heated in a vacuum oven at 80° C. for 1 h, and 150° C. for 2 h in atmospheric pressure. The processed binder was then used for the BBR test, from which parameters indicative of the characteristic of asphalt pavement durability in cold climate were derived.

Figure 8:
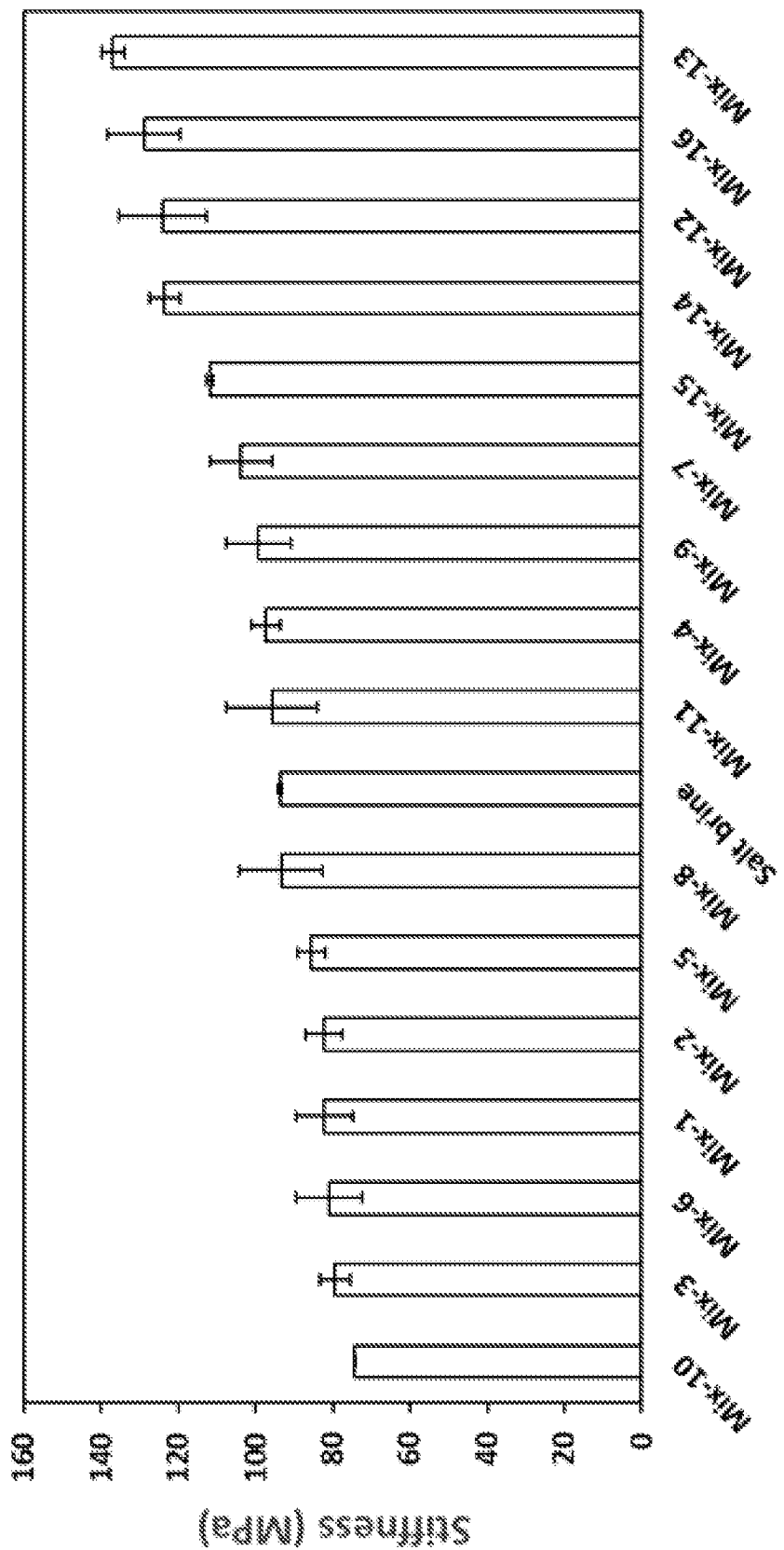
FIG. 8 is a graph of the creep stiffness of an example asphalt binder in accordance with the present technology.

FIG. 8 is a graph of the creep stiffness of an example asphalt binder in accordance with the present technology. On the horizontal axis is various anti-icer mixtures. On the vertical axis is stiffness. The results of LSD analysis showed that samples 12-14 and 16 have statistically higher stiffness compared to the control. Considering this fact that higher stiffness is a sign of higher thermal stresses, it can be concluded that no sample showed statistically benefit over the control (salt brine) in terms of low temperature asphalt binder stiffness.

Figure 9:
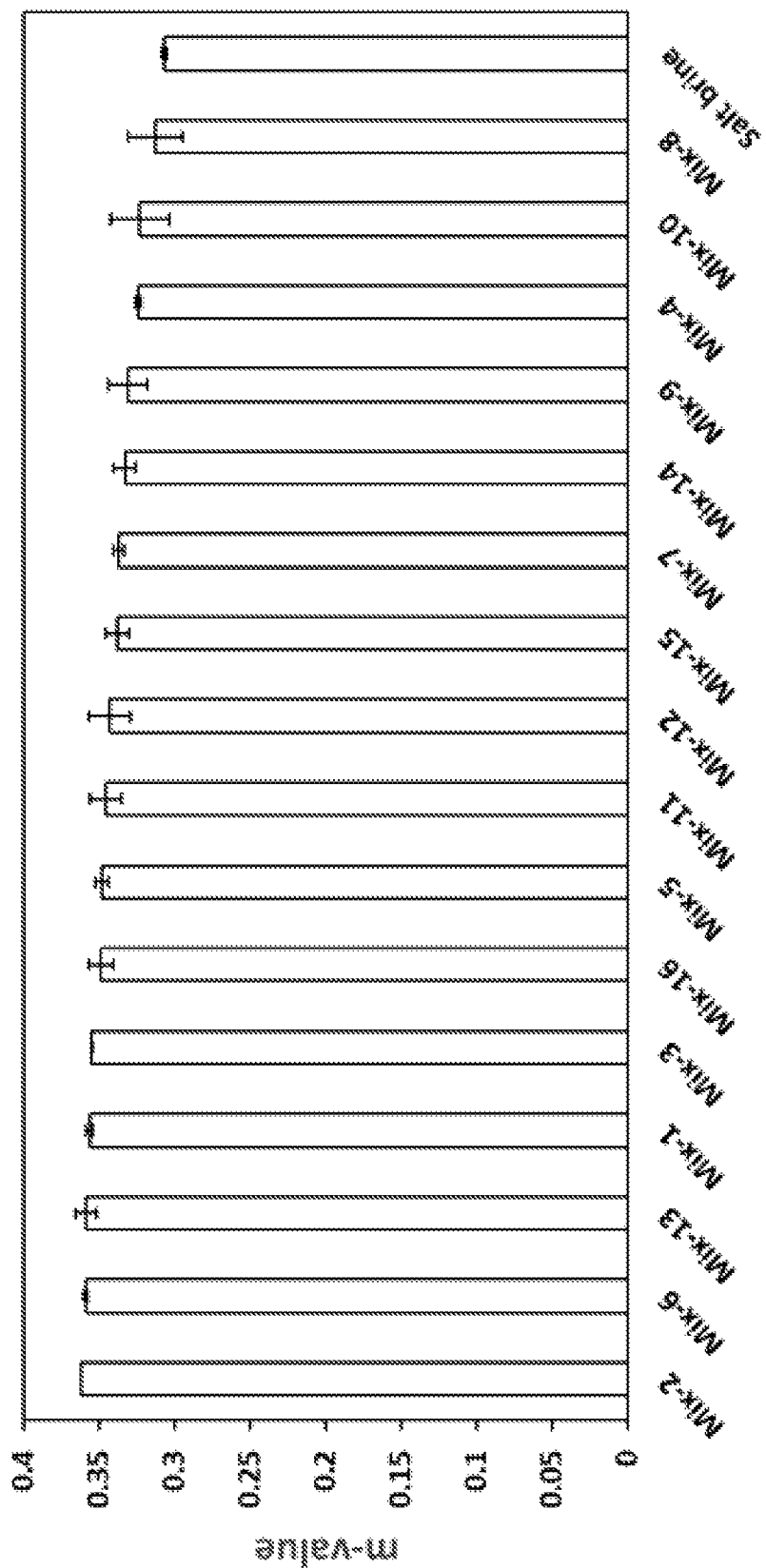
FIG. 9 is a graph of the m-value of an example asphalt binder accordance with the present technology.

FIG. 9 is a graph of the m-value of an example asphalt binder accordance with the present technology. On the horizontal axis is various anti-icer mixtures. On the vertical axis is m-value. Samples 1-3, 5, 6, 11-13, 15 and 16 had significantly higher m-values than control that shows their more ability to relax. Therefore, the innovative solutions introduced in this research were able to improve the asphalt binder low temperature performance, in terms of the ability of relaxation.

Stiffness value has a direct relationship with thermal stress; therefore, lower values of stiffness are preferred. Instead, m-value has an inverse relationship with the ability to relax; so, higher m-values are favored. The damaging effect of some anti-icer mixtures on asphalt performance could be due to the binder emulsification, destructive chemical reactions, and generation of additional stress in binder. However, the regression analysis on stiffness and m-value data showed that none of the additives has a significant effect on the low temperature performance of asphalt binder.

Figure 10:
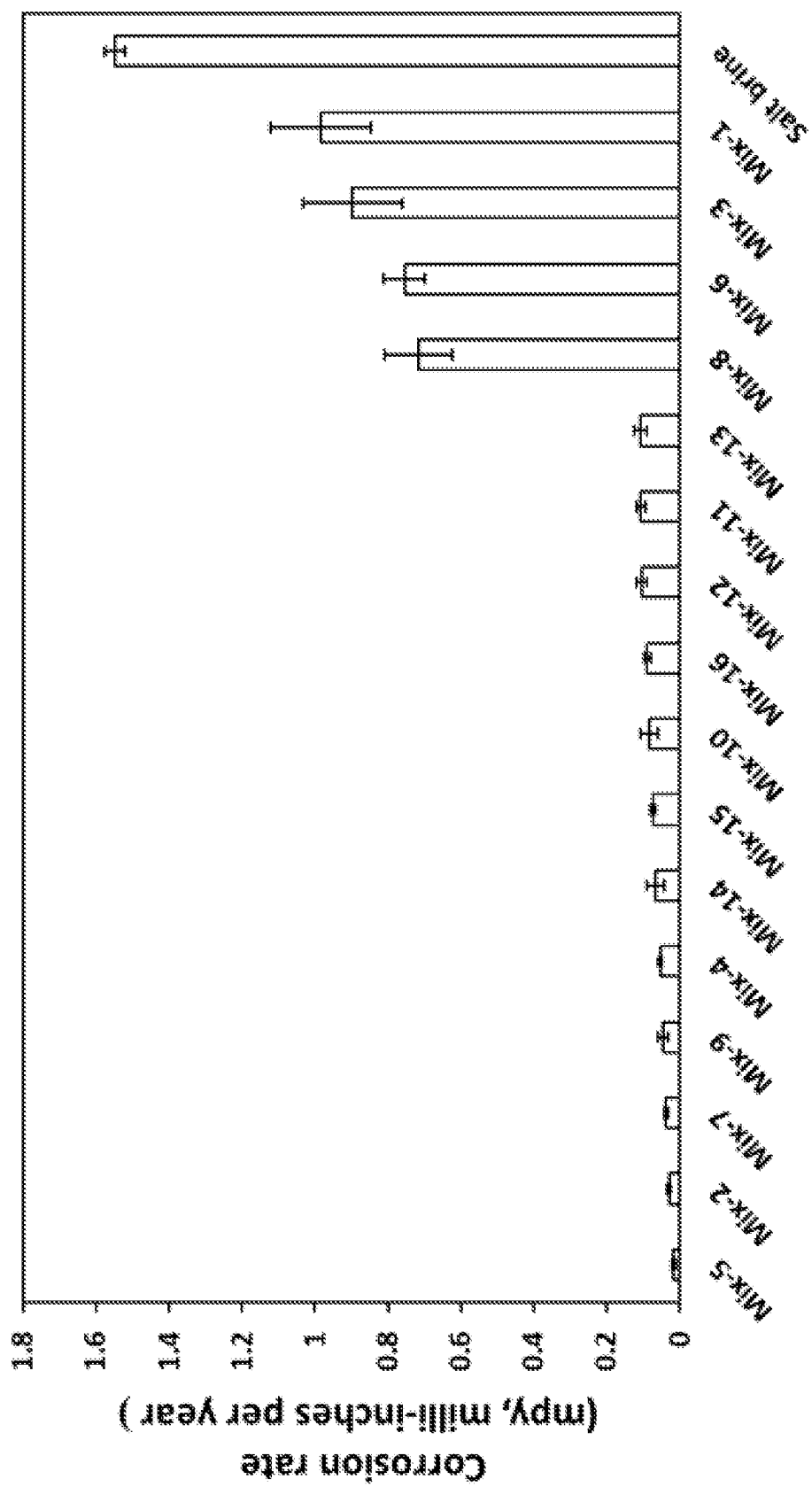
FIG. 10 is a graph of the corrosion rate of C1010 steel samples exposed to various anti-icer solutions in accordance with the present technology.

FIG. 10 is a graph of the corrosion rate of C1010 steel samples exposed to various anti-icer solutions in accordance with the present technology. On the horizontal axis is various anti-icer mixtures. On the vertical axis is the corrosion rate. It is seen that the solutions containing plant extracts alone (e.g. Mix 3) or with sodium formate (e.g. Mix 1, Mix 6, Mix 8) had higher corrosion rates than solutions that contained metasilicate. Silicate is an effective corrosion inhibitor which has been used in deicers for protecting of galvanized metals. While mixtures 1, 3, 6, and 8 were more corrosive than the other mixtures, they were still less corrosive than salt brine. The corrosion rate of the American Society for Testing and Materials (ASTM) C1010 carbon steel samples was measured by linear polarization resistance (LPR) method via a multichannel potentiostat equipped with three-electrode electrochemical cells. The LPR measurement was carried out by polarizing the coupons at ±20 mV versus the open-circuit potential (OCP) at a scan rate of 0.167 mV/s. Prior to test, the surfaces of steel samples were wet polished using 60 to 1500 grade sandpapers, and then the samples were rinsed with ethanol and DI water. Finally, the samples were immersed in anti-icer solutions for 24 h. The concentration of anti-icer solutions were same as their original concentrations, which have been mentioned in Table 7. The corrosion measurements were performed at least in duplicates.

The lower corrosion rate of the steel samples exposed to the mentioned mixtures comparing to those exposed to the salt brine, may imply a weak presence of microbiologically influenced corrosion. This may suggest that these mixtures do not pose considerable direct risk to the environment in terms of biological activity.

The results of regression analysis indicated that sodium metasilicate has a statistically significant beneficial effect on decreasing the corrosion rate (coefficient=−0.439 and $p=4.3 \times 10^{-9} < 0.05$). This effect can be due to high alkalinity of silicates. Measurement of pH showed that all mixtures containing sodium metasilicate have a pH value higher than 11.

Dandelion (coefficient=−0.075 and p=0.064) and formate (coefficient=−0.092 and p=0.104) have a slight beneficial effect on mitigating the corrosion rate, however these effects are not statistically significant at p<0.05. On the other hand, beet extract with coefficient of −0.036 and p value of 0.341 does not have statistically significant effect on decreasing the corrosion rate. The LSD analysis revealed all samples have a statistically lower corrosion rate compared to salt brine.

For choosing the best performer sample, an analytical hierarchy process (AHP) was used. Pairwise comparisons shown in Table 9 are based on the importance of each parameter. Numbers greater than one show that the row parameter is more important than the associated column parameter, and numbers less than one show the vice versa. The magnitude of the numbers shows the degree of importance.

TABLE 9

Pairwise comparisons based on multiple criteria

| Comparison | Ice melting capacity at 20 min, −3.9° C. | Ice melting capacity at 60 min, −3.9° C. | Corrosion rate | F-T mass loss | Asphalt stiffness | Asphalt m-value |
|---|---|---|---|---|---|---|
| Ice melting capacity at 20 min, −3.9° C. | 1.00 | 1.00 | 5.00 | 5.00 | 9.00 | 9.00 |
| Ice melting capacity at 60 min, −3.9° C. | 1.00 | 1.00 | 5.00 | 5.00 | 9.00 | 9.00 |
| Corrosion rate | 0.20 | 0.20 | 1.00 | 1.00 | 2.00 | 2.00 |
| F-T mass loss | 0.20 | 0.20 | 1.00 | 1.00 | 3.00 | 3.00 |
| Asphalt stiffness | 0.11 | 0.11 | 0.50 | 0.33 | 1.00 | 1.00 |
| Asphalt m-value | 0.11 | 0.11 | 0.50 | 0.33 | 1.00 | 1.00 |
| Sum | 2.62 | 2.62 | 13.00 | 12.67 | 25.00 | 25.00 |

To determine the importance weight of the decision criteria, a standardized matrix was used (Table 10). It is the result of the given values from Table 9 divided by the sum of the values in the respective columns. For instance, 1.00 from row 2 column 2 in Table 9 divided by the sum of 2.62 in row 8 column 2 gives 0.34 in Table 10.

TABLE 10

A standard matrix based on the comparisons

| Comparison | Ice melting capacity at 20 min, −3.9° C. | Ice melting capacity at 60 min, −3.9° C. | Corrosion rate | F-T mass loss | Asphalt stiffness | Asphalt m-value | Weight |
|---|---|---|---|---|---|---|---|
| Ice melting capacity at 20 min, −3.9° C. | 0.38 | 0.38 | 0.38 | 0.39 | 0.36 | 0.36 | 0.38 |
| Ice melting capacity at 60 min, −3.9° C. | 0.38 | 0.38 | 0.38 | 0.39 | 0.36 | 0.36 | 0.38 |
| Corrosion rate | 0.08 | 0.08 | 0.08 | 0.08 | 0.08 | 0.08 | 0.08 |
| F-T mass loss | 0.08 | 0.08 | 0.08 | 0.08 | 0.12 | 0.12 | 0.09 |
| Asphalt stiffness | 0.04 | 0.04 | 0.04 | 0.03 | 0.04 | 0.04 | 0.04 |
| Asphalt m-value | 0.04 | 0.04 | 0.04 | 0.03 | 0.04 | 0.04 | 0.04 |

In the next step, the prioritization matrix was determined, in which the columns have been normalized, as shown in Table 11. In this table, the decision weights were determined by averaging the standardized rows in Table 10. For example, from row 2, the average of 0.38, 0.38, 0.38, 0.39, 0.36, and 0.36 is equal to 0.38.

TABLE 11

Summary of prioritization.

| | Weight (%) | | | | | |
|---|---|---|---|---|---|---|
| | 0.38 | 0.38 | 0.08 | 0.09 | 0.04 | 0.04 |
| Sample | Ice melting capacity at 20 min, −3.9° C. | Ice melting capacity at 60 min, −3.9° C. | Corrosion rate | F-T mass loss | Asphalt stiffness | Asphalt m-value | Score |
| Mix 1 | 100.00 | 95.70 | 36.85 | 94.95 | 87.33 | 89.35 | 92 |
| Mix 2 | 80.36 | 88.47 | 99.21 | 100.00 | 87.17 | 100.00 | 88 |

TABLE 11-continued

Summary of prioritization.

| | | | | | | | |
|---|---|---|---|---|---|---|---|
| Mix 3 | 33.43 | 30.57 | 42.56 | 31.54 | 91.70 | 86.78 | 37 |
| Mix 4 | 49.90 | 100.00 | 97.59 | 81.69 | 63.11 | 31.20 | 75 |
| Mix 5 | 24.62 | 61.20 | 100.00 | 66.31 | 81.99 | 74.93 | 52 |
| Mix 6 | 31.51 | 0.00 | 51.88 | 74.06 | 89.31 | 94.04 | 30 |
| Mix 7 | 38.27 | 58.11 | 98.65 | 69.85 | 52.82 | 54.54 | 55 |
| Mix 8 | 4.69 | 89.36 | 54.33 | 84.44 | 69.45 | 10.91 | 50 |
| Mix 9 | 0.00 | 46.37 | 98.14 | 89.04 | 60.00 | 43.25 | 37 |
| Mix 10 | 43.77 | 6.20 | 95.63 | 69.15 | 100.00 | 28.81 | 38 |
| Mix 11 | 22.93 | 37.87 | 94.21 | 0.00 | 65.68 | 69.83 | 35 |
| Mix 12 | 6.66 | 41.24 | 94.33 | 32.35 | 20.49 | 65.16 | 32 |
| Mix 13 | 5.56 | 31.74 | 94.09 | 3.09 | 0.00 | 93.46 | 25 |
| Mix 14 | 18.39 | 8.64 | 96.82 | 4.21 | 21.39 | 47.33 | 21 |
| Mix 15 | 18.97 | 12.63 | 96.43 | 23.19 | 39.98 | 56.01 | 25 |
| Mix 16 | 5.51 | 8.40 | 95.31 | 23.17 | 12.87 | 76.11 | 18 |
| Control | 13.75 | 7.92 | 0.00 | 35.38 | 69.09 | 0.00 | 14 |

According to Table 11, the multi-criteria scoring system showed that salt brine (control) received the lowest score of 14. Notably, all of the mixtures' scores were higher than control's score. Mix 1 and Mix 2 exhibited the highest scores of 92 and 88, respectively. These mixtures were considered to be the best choices. Since Mix 1 had fewer additive chemicals and higher score, it was chosen as the best performer mixture and was selected for the complementary tests.

For finding the metric amount of the reduction in consumption of anti-icer, the authors examined lower amounts of best performer solution (Mix 1) in ice melting test. They observed that somewhere between 0.9 to 1 mL of Mix 1 could have an ice melting capacity equal to 1.4 mL of control (23% NaCl solution). It means about 29 to 37% decrease in the consumption of NaCl solution.

Since the maximum amount of the plant extracts used for each mixture is 6 wt. % or less, it is significantly lower than the commonly used alternative of 23% NaCl brine and sugar beet juice at 80:20 by volume (3.5:1 by weight). In addition, the use of such agro-based formulations with increased anti-icing effectiveness have lower application rates than plain 23% NaCl brine (e.g. about 30% for using Mix1 instead of 23% NaCl), further reducing the amount of chemicals needed for providing a reasonable level of service on wintry pavements.

Mix 1 was examined for determining the freezing point depression behavior and the friction coefficient of the asphalt pavement treated by anti-icing formulation (vs. no anti-icing and 23 wt. % NaCl) at −3.9° C. after being applied at 30 gal/lane-mile.

The best performer formulation was tested for the snow-pavement bond strength and friction coefficient of asphalt pavement treated by the anti-icer at −3.9° C. after being applied at 30 gal/lane-mile. This relatively low application rate of 30 gal/lane-mile was considered suitable for relatively high traffic volume roads under light snowfall and for low traffic volume roads under light snowfall with the pavement temperature of 25° F.-30° F. After anti-icer application, snow was applied and compacted to the pavement, then placed in a trafficking machine for 500 tire passes. To investigate the effect of anti-icing on the snow-pavement bond strength, the shear force required to plow the snow from the pavement surface was measured by pulling a hollow metal box equipped with a spring scale. The maximum force required to shear the snow from the pavement divided by the contact area was calculated to be the shear strength. Six snow-pavement bond shear tests were measured on each pavement sample and two pavement samples were examined. After shearing the snow, the coefficient of static friction at six locations on each of the samples mentioned earlier was measured by pulling a rubber-bottomed metal block on the pavement surface and measuring the ratio of the required force to initiate movement divided by the weight of the block.

Figure 11:
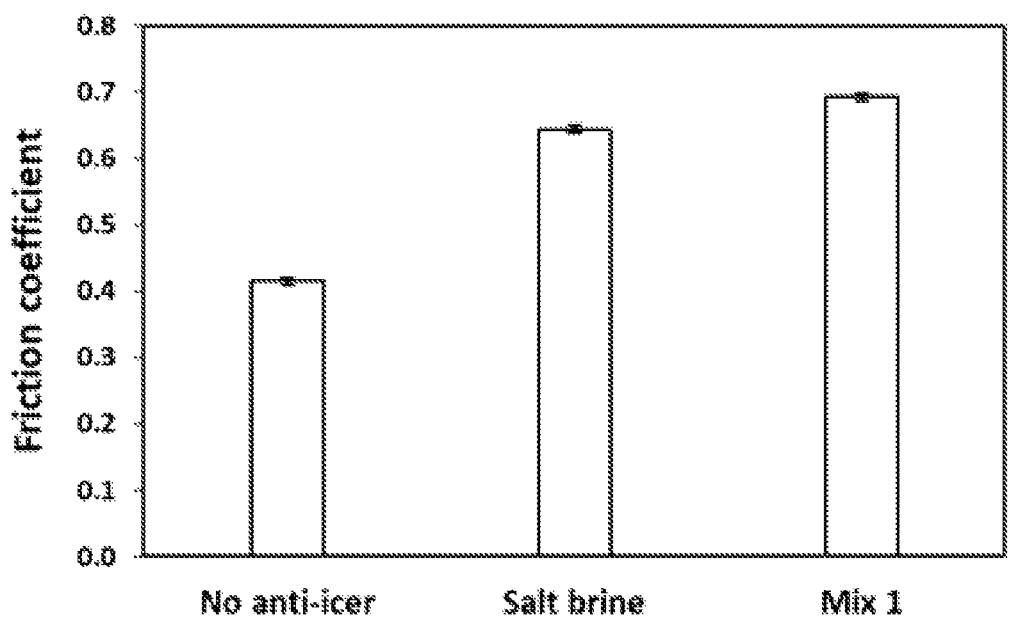
FIG. 11 is a graph of the friction coefficient of an example mix in accordance with the present technology.

FIG. 11 is a graph of the friction coefficient of an example mix in accordance with the present technology. On the horizontal axis is three compositions: no anti-icer, salt brine, and Mix 1. On the vertical axis is the friction coefficient. Application of Mix 1 resulted in an improvement on the friction coefficient compared to salt brine. This improvement is statistically significant (p<0.05) based on LSD analysis of the means comparison. This improvement is due to the increase in actual contact area caused by agricultural-based constituents.

Figure 12:
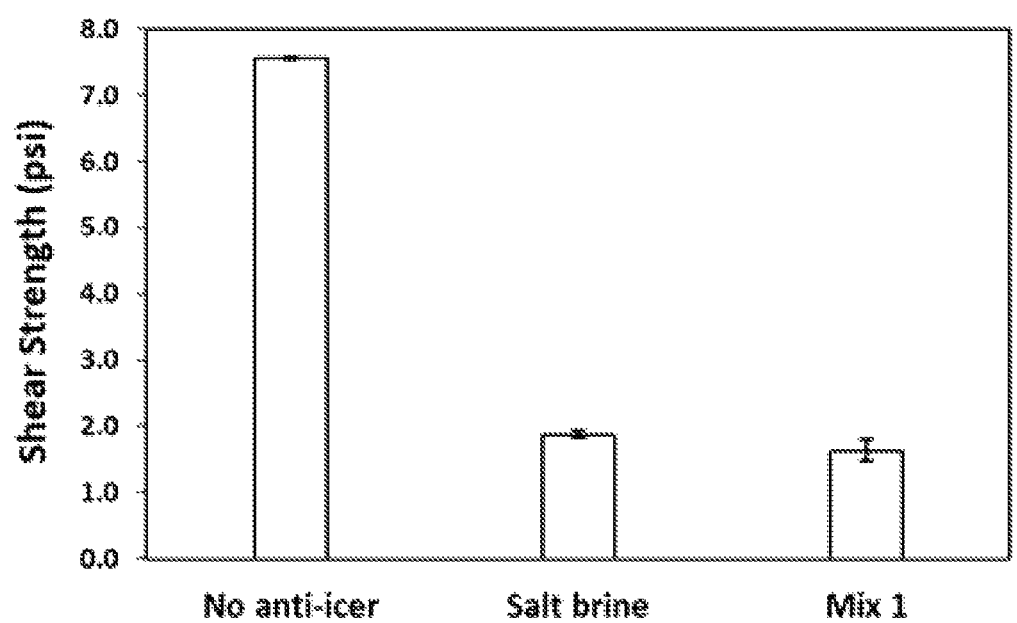
FIG. 12 is a graph of the shear strength of an example mix in accordance with the present technology.

FIG. 12 is a graph of the shear strength of an example mix in accordance with the present technology. On the horizontal axis is three compositions: no anti-icer, salt brine, and Mix 1. On the vertical axis is the shear strength. Anti-icing has decreased the bond shear strength. Mix 1 is more effective anti-icer than salt brine. However, according to LSD analysis, the difference between mean shear stress values of salt brine and Mix 1 is not statistically significant (p=0.187>0.05).

Figure 13:
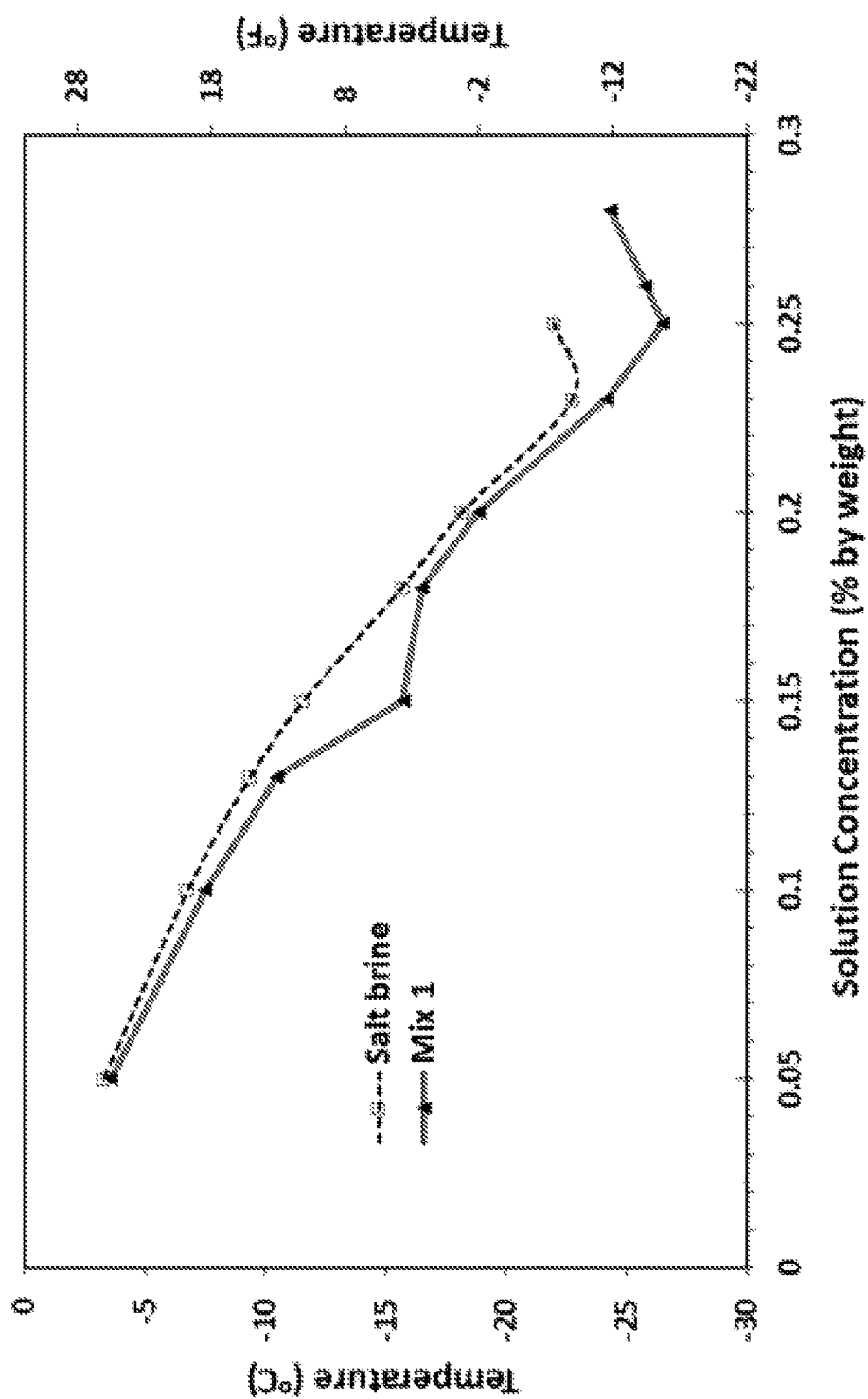
FIG. 13 is the eutectic phase diagrams for salt brine and an example mix in accordance with the present technology.

FIG. 13 is the eutectic phase diagrams for salt brine and an example mix in accordance with the present technology. On the horizontal axis is the solution concentration. On the vertical axis is the temperature. The dashed line represents salt brine. The solid line represents Mix 1. The eutectic temperature (lowest freezing point) for salt brine was −22.8° C. at 23 wt. % NaCl, while it was −26.5° C. for Mix 1 at concentration 25 wt. %. Since Mix 1 has a lower eutectic temperature than salt brine, it may also have a lower effective temperature.

For plotting the eutectic phase diagrams of anti-icer formulations, ASTM D1177 was adopted. The test set up was a flask containing 100 mL anti-icer, a stainless steel stirrer rotating with the average speed of 70 strokes per minute (35 rpm), and a thermostat coupled with a data logger to measure temperature at 1 sec scans. The test set up was kept in a temperature-controlled chamber. The temperature was decreased with the cooling rate of 0.5° C./min until the anti-icer solution was frozen. The freezing point was considered as the crossing of projections of the cooling and freezing diagrams.

The best-performer sample was used for the COD (chemical oxygen demand) test. Since the runoff in the roadway contains a diluted concentration of the anti-icer, a 3% solution of the anti-icer (3 wt. % anti-icer with 97 wt. % DI water) was used for COD measurement. Dichromate COD measurement method was used in this work. First, 2 mL of the diluted anti-icer was added to COD standard solution. The mixture was heated at 150° C. in a Hach DRB200 reactor for 120 min. Then it cooled down to room temperature (RT), and let it to be at RT for overnight to precipitate suspended particles. Then absorbance was measured at the wavelength of 420 nm using a Hach DR3900 spectrophotometer. The mg/L COD was obtained using the calibration line and the measured absorbance value for the best performer sample. For each test, three replicates were used.

The biochemical oxygen demand (BOD) of the best performer sample was measured by converting the dichromate COD content to Manganese III COD and then the result was converted to BOD. This process was done by using the tables provided by Hach company. In addition, $BOD_3$ was measured using the following procedure. 45 mL of the diluted anti-icer transferred to a BOD bottle with the total volume of 300 mL. The remaining volume of the BOD bottle was filled with aerated dilution water containing 1 mL/L of phosphate buffer solution, magnesium sulfate heptahydrate 2.25%, calcium chloride solution (2.75% w/v), and ferric chloride solution (0.025% w/v). The dilution procedure was repeated three times (three replicates). After measuring $DO_0$ (t=0) using a calibrated DO meter, the bottles were labeled and placed in the 27° C. incubator for 3 days. At day-three, the DO was measured in the incubated bottles using the DO meter ($DO_3$). The $BOD_3$ was calculated using following equation.

$$BOD_3\left(\frac{mg}{L}\right) = \frac{DO_0 - DO_3}{P} \quad (1)$$

Where, $DO_0$ and $DO_3$ are dissolved oxygen concentrations (mg/L) at t of 0 and 3 days. P is the dilution fraction which is equal to 0.15.

The COD and BOD contents of the Mix 1 are presented in Table 12. The obtained COD and BOD values are lower than the maximum levels of COD (300 mg/L) and BOD (100 mg/L) allowed by word health organization (WHO) for an effluent to irrigation channel. The values measured in this research are much less than the obtained COD (215.6 m/L) and BOD (78.0 m/L) from the modified coffee processing wastewater.

TABLE 12

Euctectic phase diagrams of salt brine and Mix 1.

| Sample | Dichromate COD (mg/L) ± 1 SE | Manganese III COD (mg/L) ± 1 SE | Estimated BOD (mg/L) ± 1 SE | Actual $BOD_3$ results ± 1 SE |
|---|---|---|---|---|
| Mix-1 (3 wt. % in water) | 114.37 ± 3.71 | 101.04 ± 3.51 | 27.07 ± 0.94 | 40.78 ± 0.70 |

Example 2: Concord Grape Extract

Below, an analysis of concord grape extract as an anti-icer is presented.

To prepare the anti-icer formulations, we used deionized water, reagent-grade sodium chloride, sodium metasilicate, and sodium formate, commercial-grade glycerin (Nature's Oil, Streetsboro, Ohio), and laboratory developed Concord grape extract. Each formulation had the same amount of sodium chloride (18.4 wt. %) and various amounts of other constituents.

All of the reagent-grade chemicals used in this research were purchased from Fisher Scientific (Fair Lawn, N.J.), Sigma Aldrich (St. Louis, Mo.), and J. T. Baker (Phillipsburg, N.J.).

In order to minimize the number of experiments needed to explore a large domain of unknown factors and interactions, a scheme of statistical design of experiments known as central composite design was used. For instance, if four influential factors were analyzed, each varying at five different levels, without experimental design, there would be a total of $4^4$ (=256) experiments. With central composite design, however, we could choose to conduct only 21 experiments, the data from which should be sufficient to reasonably illustrate the inherent relations between the influential factors and the target factors.

Using central composite design, we chose four factors of $X_1$, $X_2$, $X_3$, and $X_4$ as the weight percent of Concord grape extract, glycerol, sodium formate, and sodium metasilicate, respectively. The weight percent range of 0-6 g was chosen for $X_1$-$X_3$, and 0-4.5 g for $X_4$. The anti-icer formulations were investigated by adopting the design parameters and associated target attributes, shown in Table 13.

TABLE 13

Anti-icer mixtures designed based on central composite design method using Design-Expert ® software.

| Mix # | Weight percent of additives (%) | | | |
|---|---|---|---|---|
| | Concord grape extract | Glycerol | Sodium formate | Sodium metasilicate |
| Mix 1 | 2.40 | 2.40 | 2.40 | 1.80 |
| Mix 2 | 4.80 | 2.40 | 2.40 | 1.80 |
| Mix 3 | 2.40 | 2.40 | 2.40 | 1.80 |
| Mix 4 | 1.94 | 2.86 | 1.94 | 2.14 |
| Mix 5 | 1.94 | 2.86 | 2.86 | 2.14 |
| Mix 6 | 2.40 | 2.40 | 2.40 | 1.80 |
| Mix 7 | 2.40 | 2.40 | 2.40 | 1.80 |
| Mix 8 | 2.40 | 2.40 | 4.80 | 1.80 |
| Mix 9 | 1.94 | 1.94 | 1.94 | 1.46 |
| Mix 10 | 1.94 | 1.94 | 2.86 | 1.46 |
| Mix 11 | 2.86 | 1.94 | 1.94 | 2.14 |
| Mix 12 | 2.86 | 2.86 | 2.86 | 1.46 |
| Mix 13 | 2.40 | 2.40 | 2.40 | 3.60 |
| Mix 14 | 2.86 | 2.86 | 1.94 | 1.46 |
| Mix 15 | 2.40 | 4.80 | 2.40 | 1.80 |
| Mix 16 | 2.40 | 2.40 | 2.40 | 0.00 |
| Mix 17 | 2.40 | 0.00 | 2.40 | 1.80 |
| Mix 18 | 2.40 | 2.40 | 0.00 | 1.80 |
| Mix 19 | 2.86 | 1.94 | 2.86 | 2.14 |
| Mix 20 | 0.00 | 2.40 | 2.40 | 1.80 |
| Mix 21 | 2.40 | 2.40 | 2.40 | 1.80 |

For preparation of the extract, the as-received Concord grape waste powder (FruitHealth, Grandview, Wash.) was milled to get a more homogenous powder. Then, 30 g of the powder was chosen for chemical degradation. For chemical degradation, 30 g of the Concord grape powder, 120 g of urea, 0.5 g of Ca(OH)$_2$, and 3 g of NaOH were added to 200 mL of deionized water. The solution was stirred vigorously for 30 min, then placed in the refrigerator at −20° C. overnight. The iced solution was removed from the refrigerator and put in room temperature for some hours until a slurry of ice and liquid was achieved. The solution was then stirred vigorously for 30 min, during which 250 mL of water was added gradually. For biological degradation, the pH of the prepared solution was adjusted to around 8.5 by adding HNO$_3$ and NaOH. A mixture of KH$_2$PO$_4$, NaH$_2$PO$_4$.H$_2$O, and MgSO$_4$.7H$_2$O with the molar ratios of 7, 10.7, and 1, respectively, and total weight of less than 4 g was added to the solution to create an appropriate environment for the growth of bacteria. Next, 100 mL of *Bacillus megaterium* bacteria (NRRL B-14308) was added to the solution, and the solution was put in the shaker for 21 days to complete the biodegradation process (i.e., "natural fermentation").

It should be mentioned that all of the chemicals used in this section were reagent-grade. In addition, the freeze-dried *Bacillus Megaterium* bacteria was purchased from Ward's Science (Rochester, N.Y.).

The pH of samples was measured using a Milwaukee MW100 portable pH meter with 0.1 pH resolution (Milwaukee Instruments, Rocky Mount, N.C.). Before running the experiments, the pH probe was calibrated using the buffer solutions with the pHs of 4 and 7, respectively based on the instrument manual. For the measurement, the pH probe was placed in the test solution until the measured pH value was stable.

Figure 14:
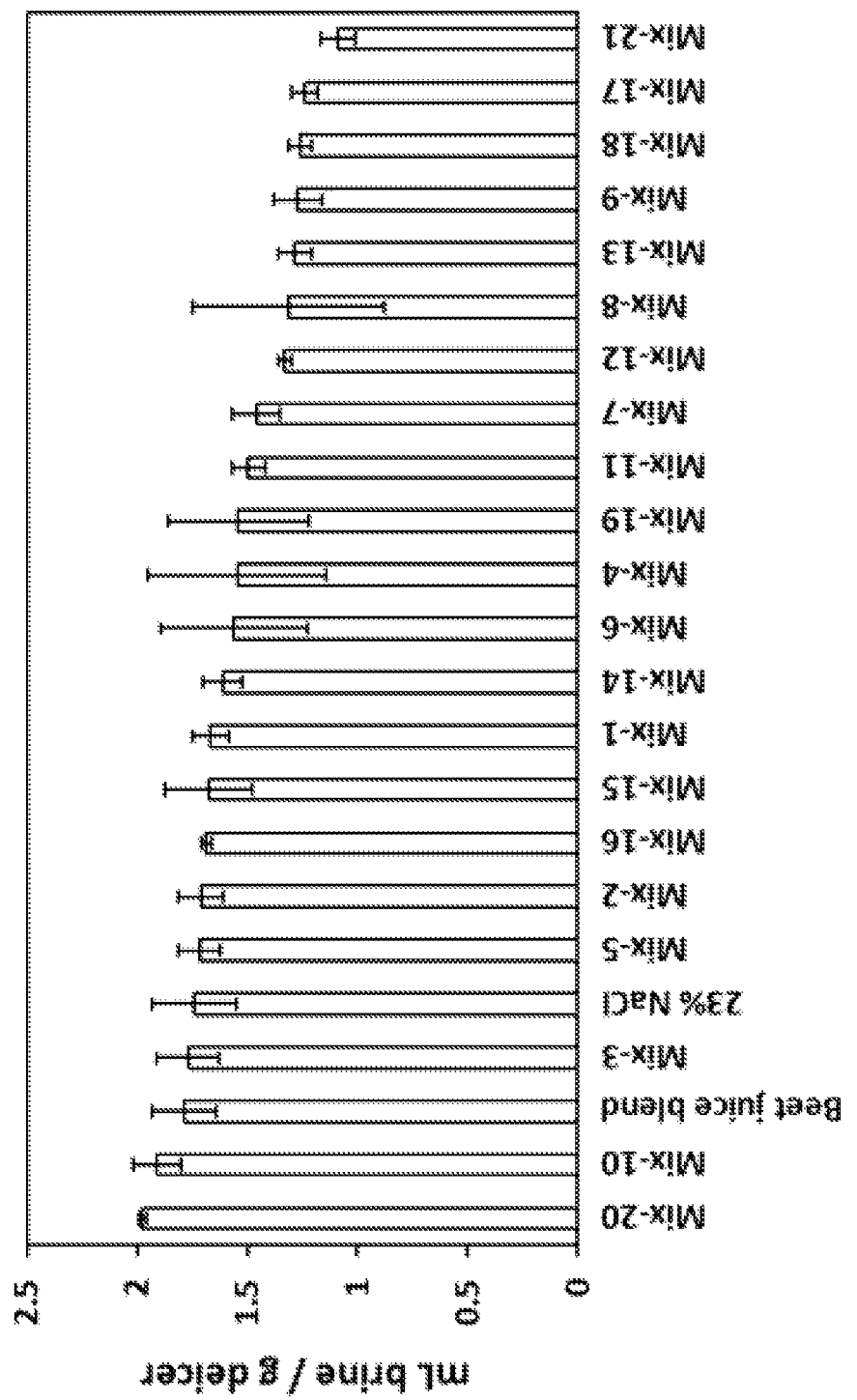
FIG. 14 is a graph of the 20-minute ice-melting capacity of various example anti-icers in accordance with the present technology.

FIG. 14 is a graph of the 20-minute ice-melting capacity of various example anti-icers in accordance with the present technology. On the horizontal axis is various anti-icer mixtures. On the vertical axis is mL of brine per gram of deicer. The 20 min ice-melting capacity of selected anti-icers were measured at −3.9° C. The differences in ice-melting capacities of 23% NaCl and beet juice/salt brine blend with mixture 20 were significant (equal or more than 0.2 mL brine/g anti-icer), which indicates the advantage of the use of mixture 20 over them.

Figure 15:
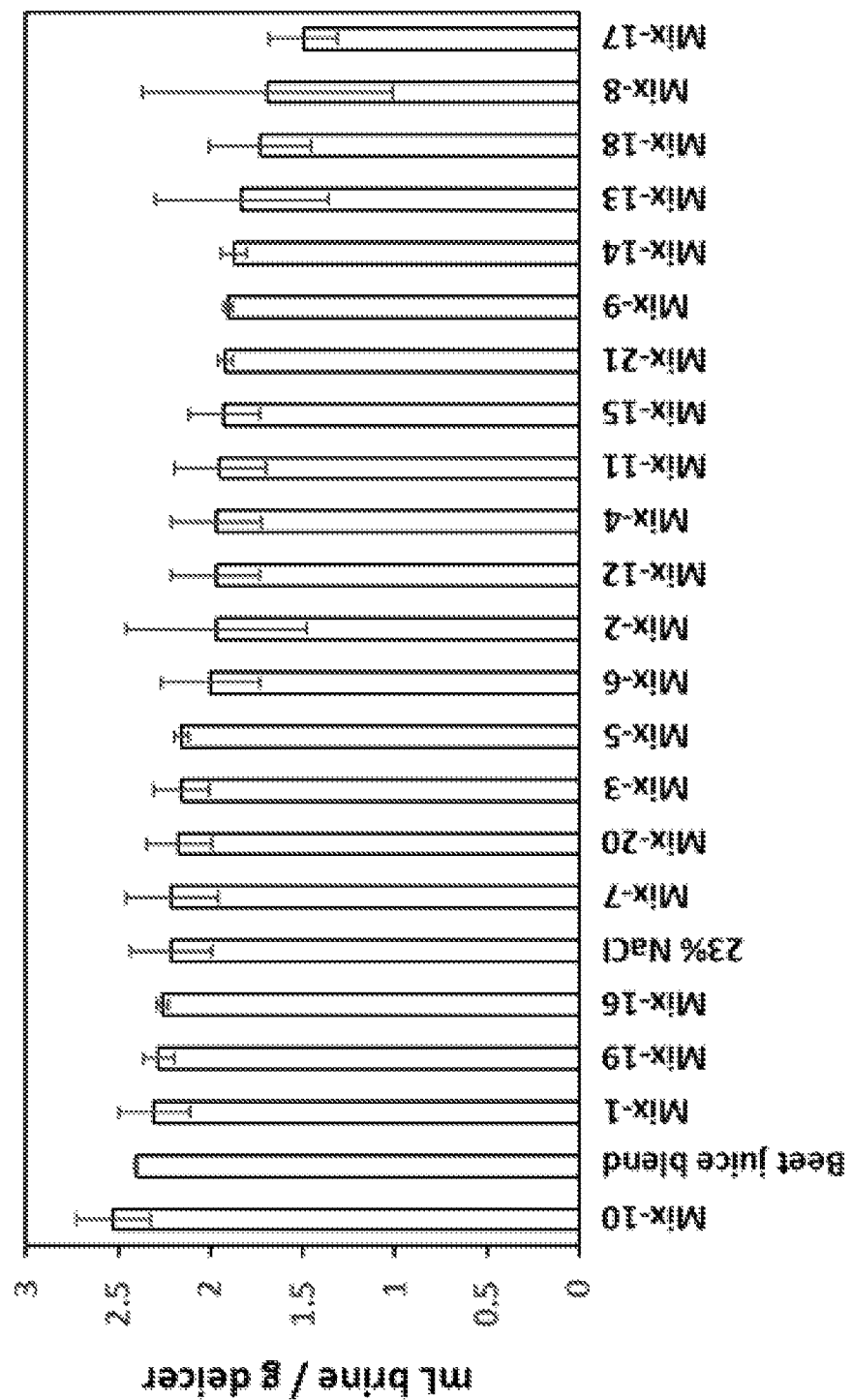
FIG. 15 is a graph of the 60-minute ice melting capacity of various example anti-icers in accordance with the present technology.

FIG. 15 is a graph of the 60-minute ice melting capacity of various example anti-icers in accordance with the present technology. On the horizontal axis is various anti-icer mixtures. On the vertical axis is mL of brine per gram of deicer. The 60 min ice-melting capacity of selected anti-icers were measured at −3.9° C. No sample had an ice-melting capacity of at least 0.2 unit more than both 23% NaCl and beet juice/salt brine blend. The best sample (sample 10) could outperform 23% NaCl by more than 0.2 unit and beet juice/salt brine blend by 0.13 unit. This made it a potential candidate for roadway anti-icing, instead of using the controls (23% NaCl brine and the beet juice/salt brine blend). Considering ice-melting capacity at both 20 min and 60 min, mixture 10 had a relative advantage over the controls.

The SHRP ice-melting test method is used for measuring the quantity of ice melted by deicers over time. In this test, liquid or solid deicers are uniformly spread over the prepared ice, and the melted liquid is removed for volume measurements (Chappelow et al. 1992). A modified SHRP test using 1.4 mL anti-icer, 48 mL distilled deionized water, and a 150×20 mm (5.9 in.: diameter×0.8 in.: depth) polystyrene petri dish was conducted to measure the ice-melting capacity of the anti-icer at −9.4° C. (−9.4° C.). The anti-icer was applied evenly over the ice surface with a syringe. After 10, 20, 30, 45, and 60 min, the liquid volume was removed and volumetrically measured with a calibrated syringe. Another parallel series of tests were conducted in a 3.65 m×4.27 m state-of-the-art temperature-regulated environmental chamber, following the same procedure. The tests were conducted at −3.9° C. To ensure statistical reliability, duplicate tests were performed for each combination of anti-icer type.

The effects of anti-icers on concrete were assessed by conducting a freeze-thaw test of Portland cement mortar (PCM) samples in the presence of anti-icers, following the SHRP (Strategic Highway Research Program) H205.8 test method (Chappelow et al. 1992) with minor modifications. The test evaluates the combined effects of liquid chemicals and freeze-thaw cycling on the structural integrity of specimens of non-air-entrained mortar. Mortar samples were prepared in 5.1 cm×10.2 cm poly (vinyl chloride) piping with a volume of 52.5 cm³. The mortar mix design had a water-to-cement ratio of 0:5, sand-to-cement ratio of 3:1, and water reducer of 1.5 mL. The cement used was Portland cement type I-II; the sand used was a Sakrete multipurpose sand (Sakrete Inc., Cincinnati, Ohio). Samples were cured in water for the first 24 h before being placed in a container with 100% relative humidity. The dry weight of each sample at 28 days was recorded before the sample was placed on a sponge inside a dish containing 310 mL of diluted (3%) anti-icer solution. The dish was covered in plastic wrap to press the mortar samples into the sponge and to prevent evaporation of anti-icer solutions. Three mortar specimens were tested in each anti-icer solution. 23% NaCl brine solution and beet juice blend or more specifically beet juice/salt brine blend (80% (v/v) 23% NaCl solution+20% (v/v) beet juice) were used as the controls. A thermocoupler was embedded in one of the control mortar samples to monitor temperatures during freeze-thaw cycling. The sealed dishes were placed in the freezer for 16 to 18 h, at −20.8±0.2° C., and afterward were placed in a laboratory environment for 6 to 8 h, at 23.2±0.2° C. The cooling rate in the freezer and the heating rate in the laboratory environment were about 0.06° C./min and 0.07° C./min, respectively. This cycle was repeated for 10 days. The test specimens were removed from the dish, and the scaled-off materials were removed using a plastic brush. The specimens were air-dried overnight before the final weight of each was recorded. Most of the samples showed weight gain in spite of scaling, which demonstrates the absorption of anti-icers by most of the specimens. Therefore, weight loss data were not used for evaluating the effectiveness of the anti-icer solutions.

Figure 16:
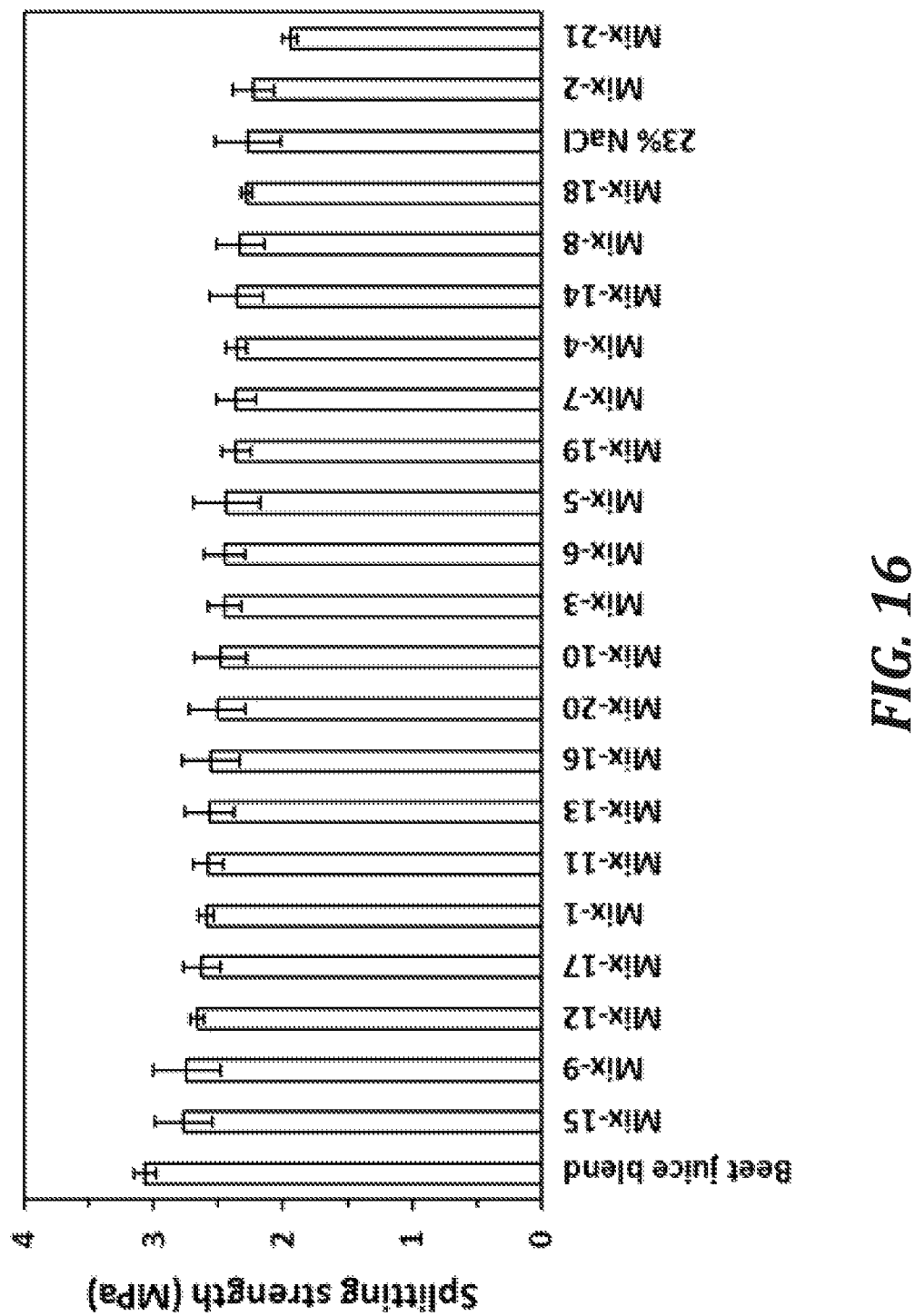
FIG. 16 is a graph of the average splitting strength of PCM samples after 10-cycle freeze-thaw testing in accordance with the present technology.

FIG. 16 is a graph of the average splitting strength of PCM samples after 10-cycle freeze-thaw testing in accordance with the present technology. On the horizontal axis is various anti-icer mixtures. On the vertical axis is splitting strength. Illustrated is the average splitting strength of PCM (Portland cement mortar) samples after 10-cycle freeze-thaw testing in various anti-icers, along with two control samples in 23% NaCl brine and beet juice/salt brine blend. These results show that the splitting strength of the PCM samples exposed to all mixtures but mixtures 2 and 21 was higher than that of the samples exposed to 23% NaCl. Note that all mortar samples exhibited lower splitting strength values than the samples exposed to the beet juice/salt brine blend, suggesting more compromised mortar materials.

In a freeze-thaw process, water penetrates the surface and internal pores of the cementitious material in the thawing cycle and it then freezes in the freezing cycle. The main mechanisms by which freeze/thaw cycles deteriorate mortar and concrete include the buildup of tensile stresses by volume expansion (due to phase transition from water to ice) and by hydraulic or osmotic pressures (Chen et al. 2016; Pigeon and Pleau 2010; Xu and Shi 2018). Common symptoms of freeze/thaw damage include cracking, surface scaling, and internal damage of the mortar or concrete's microstructure. The main impacts of surface scaling include weight loss and reduction of its surface cover, while internal damage leads to a decrease in splitting tensile strength, compressive strength, and elastic modulus of the material (Zandi Hanjari et al. 2011; Zhang et al. 2017). The presence of deicer (or anti-icer) can further complicate the mechanisms of freeze/thaw damage of mortar and concrete, by a host of pathways. For instance, deicer can lower the saturation or vapor pressure and lower the ice formation temperature, which may help reduce the damage. Deicer can also increase the number of freeze/thaw cycles, increase the degree of saturation, aggravate the temperature variations across the concrete matrix, and amplify the osmotic pressures during freezing, all of which contribute to more damage (Pigeon and Pleau 2010; Xu and Shi 2018). More importantly, deicers can chemically react with cement paste and cause calcium leaching, degradation of C—S—H gel and formation of deleterious crystalline phases inside the concrete (Qiao et al. 2018; Shi et al. 2010; Xie et al. 2017).

Most of the mortar samples exposed to bio-based anti-icers had higher splitting tensile strength than the samples exposed to 23% NaCl. This shows lower internal damage, which may be due to reduced activity of bio-based anti-icers with cement paste, or to formation of new phases with higher strength as the result of chemical reactions between the additives and mortar constituents (Heikal 2004; Shi et al. 2010).

A customized test protocol was used to assess the effect of anti-icers on the low-temperature behavior of asphalt pavement. A bending beam rheometer (BBR) was used for this purpose. Asphalt binder (PG 64-28 from Western States Asphalt, Spokane, Wash.) was first aged in a rolling thin-film oven to simulate the aging of hot-mix asphalt concrete during mixing and placement of the asphalt pavement. The asphalt binder was then placed in a pressure-aging vessel with the air pressure of 2.10 MPa for 20 h to simulate the long-term field oxidative aging conditions (Bahia and Anderson 1993). The asphalt binders were moved to a can, and 4 mL of anti-icer solution was applied for each 40 g of binder, after which the cans were put in an oven at 80° C. for 1 h, followed by 2 h at 155° C. and atmospheric pressure. Finally, beams were molded and tested in the BBR.

Figure 17:
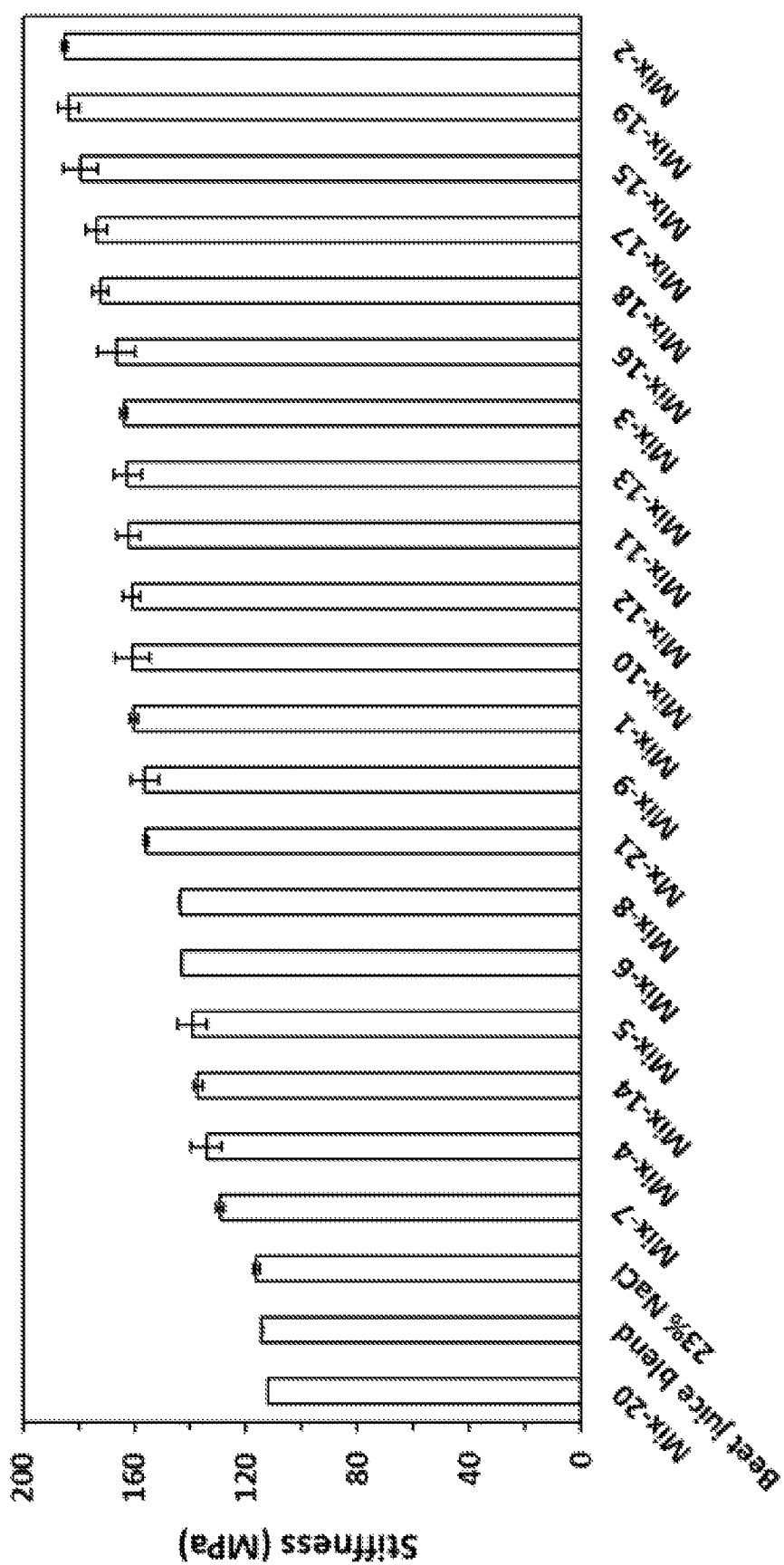
FIG. 17 is a graph of the creep stiffness of an example asphalt binder in accordance with the present technology.
Figure 18:
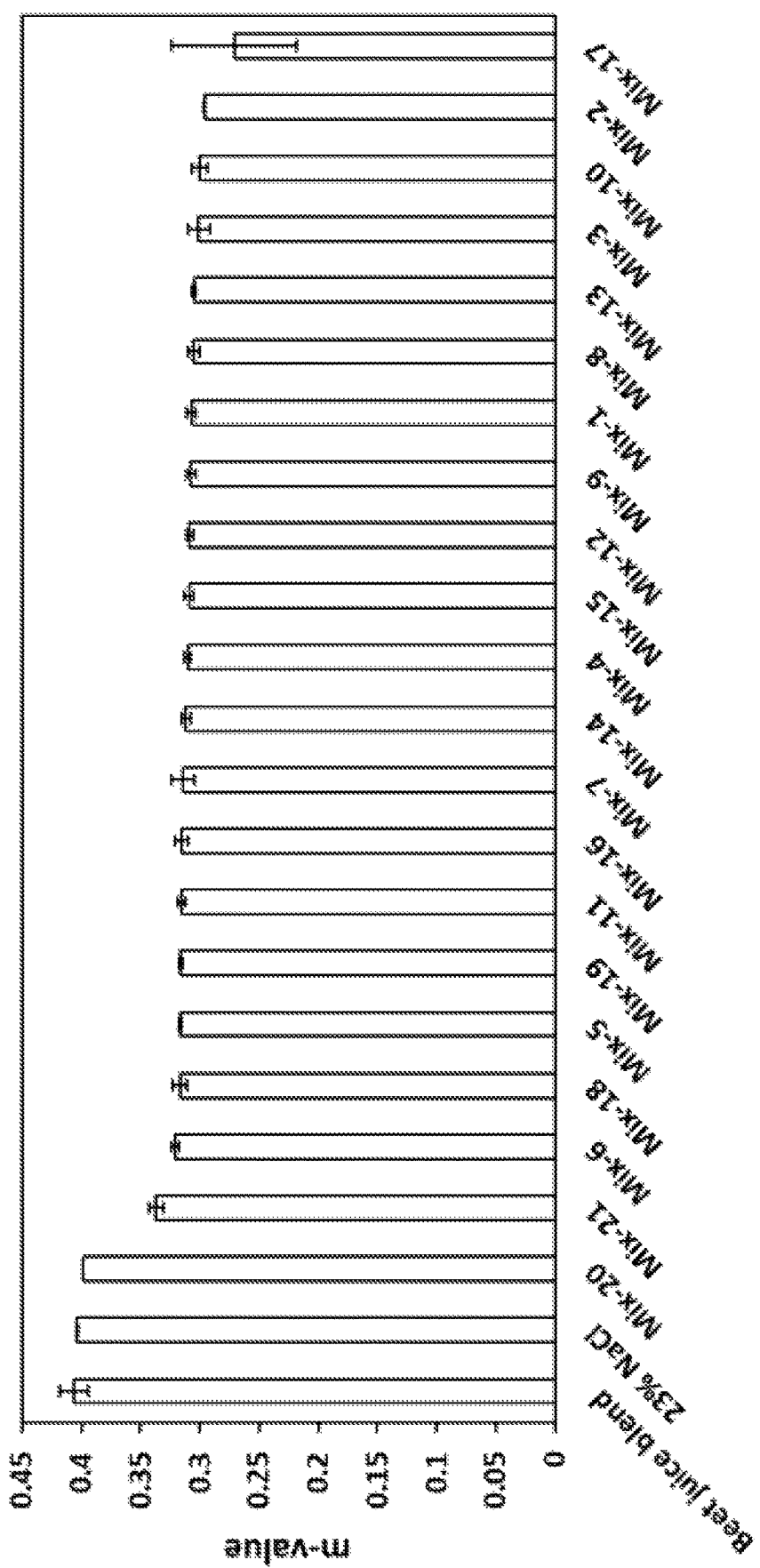
FIG. 18 is a graph of the m-value of an example asphalt binder in accordance with the present technology.

The effect of anti-icers on asphalt was assessed with a BBR by exposing the asphalt binder to anti-icers and thermal and pressure aging, and subsequent testing of the binder beams with the BBR. FIG. 17 is a graph of the creep stiffness of an example asphalt binder in accordance with the present technology. On the horizontal axis is various anti-icer mixtures. On the vertical axis is stiffness. FIG. 18 is a graph of the m-value of an example asphalt binder in accordance with the present technology. On the horizontal axis is various ice mixtures. On the vertical axis is m-value.

Higher stiffness values correspond to higher thermal stresses and higher risk of thermal cracking (at cold temperatures experienced during the use phase instead of construction phase of asphalt pavement), so a maximum limit of 185.13 MPa was specified. On the other hand, lower m-values indicate less ability to relax and thus higher risk of thermal cracking, so a minimum limit of about 0.271 was specified. The m-value and stiffness values varied in the range of 0.271-0.406 and 112.13-185.13 MPa, respectively. In terms of both parameters, Mix-20 features values close to the beet juice/salt brine blend and salt brine. The experimental results indicated the higher impact of anti-icer design on the stiffness values than on the m-value. The impact of examined anti-icer mixtures on the creep stiffness of the asphalt binder could be attributed to the binder emulsification phenomenon (Pan et al. 2008; Yang et al. 2018) and possibly other physicochemical interactions between the anti-icer and asphalt molecules.

Figure 19:
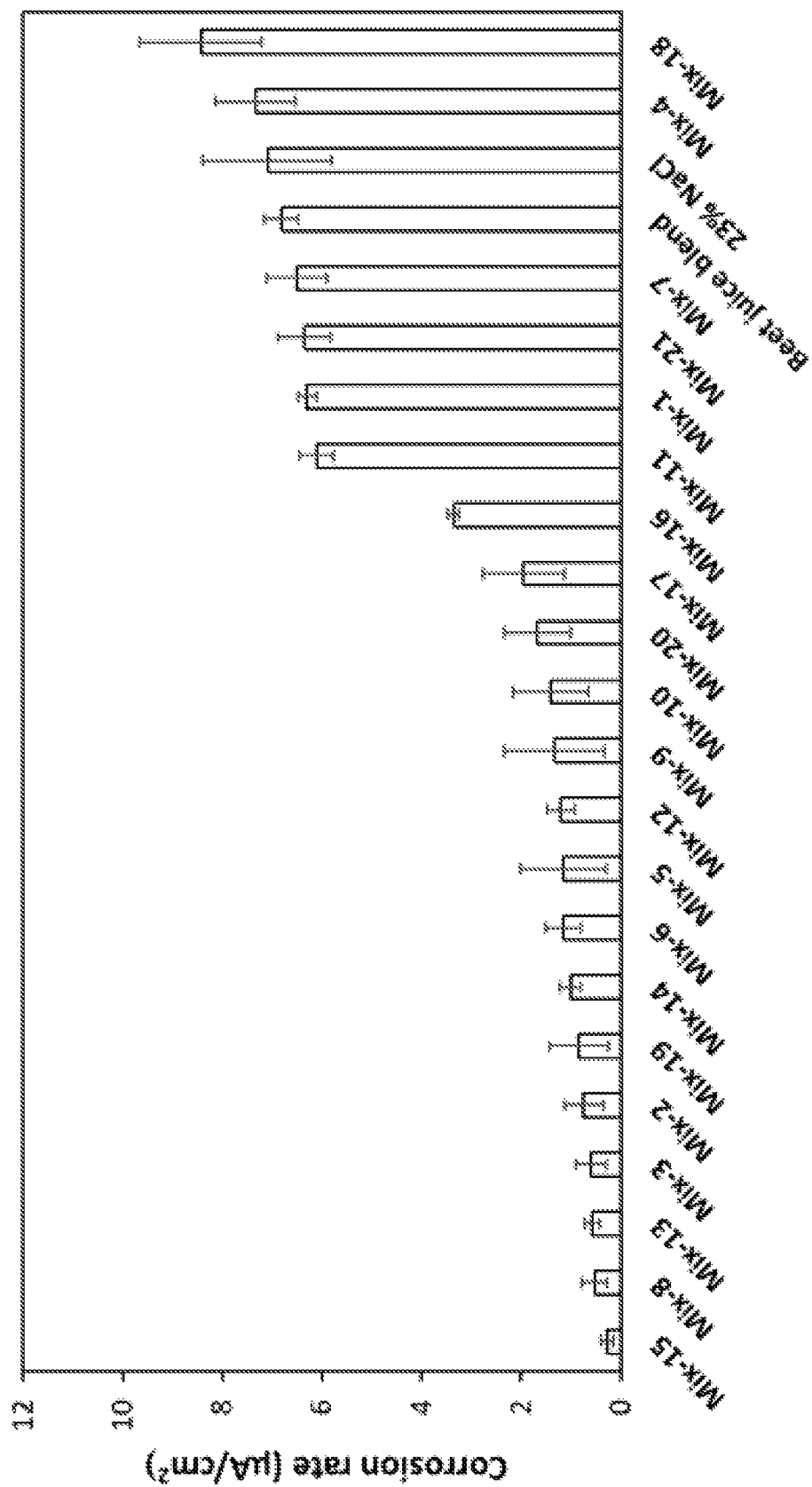
FIG. 19 is a graph of the corrosion rate of C1010 steel samples exposed to various anti-icer solutions in accordance with the present technology.

FIG. 19 is a graph of the corrosion rate of C1010 steel samples exposed to various anti-icer solutions in accordance with the present technology. On the horizontal axis is various anti-icer mixtures. On the vertical axis is the corrosion rate. As shown in FIG. 19, the corrosion rates of most of C1010 carbon steel samples exposed to anti-icer mixtures were lower than the corrosion rates of the samples exposed to 23% NaCl brine and beet juice/salt brine blend. The steel samples exposed to mixtures 2, 3, 5, 6, 8-10, 12-15, 17, and 20 showed average corrosion rates lower than 2 $\mu A/cm^2$. Among them, Mix-15, which had the highest amount of glycerin (4.8%), caused the lowest corrosion rate of the steel samples (0.32 $\mu A/cm^2$); Mix-16 showed the corrosivity of 3.36 $\mu A/cm^2$. Samples exposed to mixtures 1, 4, 7, 11, and 21 had corrosion rates below 8 $\mu A/cm^2$. Note that Mix-18, with zero-percent sodium formate, caused the most severe corrosion on the coupons. This result shows the critical role of sodium formate in mitigating general corrosion.

The product of steel corrosion is rust, which is made of iron oxide and hydroxide compounds (Wang et al. 2019). Some researchers have shown that formate compounds can react with the rust and form Fe(II-III) hydroxy-formate which is able to interfere in the steel corrosion and thus serve as a corrosion inhibitor (Refait et al. 2006). This is in good agreement with the results obtained in this research, which showed anti-corrosion property of sodium formate.

The corrosion caused by anti-icers to C1010 carbon steel (ASTM A569) was assessed using the linear polarization resistance (LPR) technique. Measurements for this technique were carried out in a PARSTAT-MC multichannel potentiostat-galvanostat (Princeton Applied Research, Oak Ridge, Tenn.), coupled with a three-electrode electrochemical cell for each channel. Before testing, the steel coupons were wet-polished using 60 to 1500 grit silicon carbide papers and washed with ethanol and distilled deionized water. For each anti-icer, at least two steel coupons were exposed to anti-icer for 24 h. The LPR measurement "is the only corrosion monitoring method that allows corrosion rates to be measured directly, in real time" (Metal Samples 2018). This electrochemical technique provides an alternative to the gravimetric method in rapidly assessing the corrosivity of solutions. The corrosivity of each anti-icer was reported as $\mu A/cm^2$.

An interesting point is that mixtures 10 and 20, which had the best ice-melting capacity, provided inhibition efficiency (IE) of 92.3% and 86.1%, respectively (calculated using the following equation).

$$IE \% = \left( \frac{CR_{uninhibited} - CR_{inhibited}}{CR_{uninhibited}} \right) \times 100 \qquad (2)$$

where $CR_{uninhibited}$ and $CR_{inhibited}$ are the corrosion rates of the steel samples exposed to salt brine and to anti-icer mixtures, respectively.

The analytical hierarchy process (AHP) was employed for making a decision matrix to prioritize the anti-icer solutions. This process, which assisted us in the multi-criteria decision-making process, allows agencies to evaluate various alternatives in terms of a set of given criteria. Pairwise comparisons, shown in Table 14, are made based on the fact that, if the row parameter is considered more important than the parameter in the column, a number greater than one is assigned to the matrix based on the intensity of importance. A higher number indicates greater importance. Conversely, if the parameter in the column is considered more important, the reciprocal of the nonzero value is assigned in the matrix (Triantaphyllou and Mann 1995).

TABLE 14

Pairwise comparisons based on multiple criteria.

| Comparison | Ice-melting capacity at 20 min, −3.9° C. | Ice-melting capacity at 60 min, −3.9° C. | Corrosion rate | PCM splitting strength | Asphalt binder stiffness | Asphalt binder m-value |
|---|---|---|---|---|---|---|
| Ice-melting capacity at 20 min, −3.9° C. | 1.00 | 1.00 | 5.00 | 1.00 | 9.00 | 9.00 |
| Ice-melting capacity at 60 mm, −3.9° C. | 1.00 | 1.00 | 5.00 | 1.00 | 9.00 | 9.00 |
| Corrosion rate | 0.20 | 0.20 | 1.00 | 1.00 | 2.00 | 2.00 |
| PCM splitting strength | 1.00 | 1.00 | 1.00 | 1.00 | 2.00 | 2.00 |
| Asphalt binder stiffness | 0.11 | 0.11 | 0.50 | 0.50 | 1.00 | 1.00 |
| Asphalt binder m-value | 0.11 | 0.11 | 0.50 | 0.50 | 1.00 | 1.00 |
| Sum | 3.42 | 3.42 | 13.00 | 5.00 | 24.00 | 24.00 |

The comparisons are used in a standardized matrix to determine the weights of importance of the decision criteria, as shown in Table 15. The standardized matrix is the result of the assigned value from Table 14 divided by the sum of the assigned values in the respective columns. For example, the 1.00 from row 2 column 2 in Table 14 divided by the sum of 3.42 in row 8 column 2 of Table 14 gives us 0.29 in row 2 column 2 of Table 15.

TABLE 15

A standard matrix based on comparisons

| Comparison | Ice-melting capacity at 20 min, −3.9° C. | Ice-melting capacity at 60 min, −3.9° C. | Corrosion rate | PCM splitting strength | Asphalt binder stiffness | Asphalt binder m-value | Weight |
|---|---|---|---|---|---|---|---|
| Ice-melting capacity at 20 min, −3.9° C. | 0.29 | 0.29 | 0.38 | 0.20 | 0.38 | 0.38 | 0.32 |
| Ice-melting capacity at 60 min, −3.9° C. | 0.29 | 0.29 | 0.38 | 0.20 | 0.38 | 0.38 | 0.32 |
| Corrosion rate | 0.06 | 0.06 | 0.08 | 0.20 | 0.08 | 0.08 | 0.09 |
| PCM splitting strength | 0.29 | 0.29 | 0.08 | 0.20 | 0.08 | 0.08 | 0.17 |
| Asphalt binder stiffness | 0.03 | 0.03 | 0.04 | 0.10 | 0.04 | 0.04 | 0.05 |
| Asphalt binder m-value | 0.03 | 0.03 | 0.04 | 0.10 | 0.04 | 0.04 | 0.05 |
| Sum | 1.00 | 1.00 | 1.00 | 1.00 | 1.00 | 1.00 | |

A summary of the prioritization matrix is shown in Table 16, in which each column has been normalized, with 0 and 100 being the worst and best performer, respectively. Each decision weight in Table 16 was determined by calculating the average of the standardized rows in Table 15. For example, from row 1, the average of 0.29, 0.29, 0.38, 0.20, 0.38, and 0.38 is equal to 0.32.

TABLE 16

Summary of prioritization.

| | Weight | | | | | | |
|---|---|---|---|---|---|---|---|
| | 0.32 | 0.32 | 0.09 | 0.17 | 0.05 | 0.05 | |
| Sample | Ice-melting capacity at 20 min, −3.9° C. | Ice-melting capacity at 60 min, −3.9° C. | Corrosion rate | PCM splitting strength | Asphalt binder stiffness | Asphalt binder m-value | Score |
| Mix 1 | 64.97 | 78.64 | 26.13 | 57.61 | 34.13 | 26.63 | 61 |
| Mix 2 | 70.06 | 46.12 | 94.23 | 25.52 | 0.00 | 18.69 | 51 |
| Mix 3 | 76.84 | 64.56 | 95.95 | 45.23 | 29.41 | 22.33 | 64 |
| Mix 4 | 51.41 | 45.63 | 13.32 | 36.89 | 69.67 | 29.25 | 43 |
| Mix 5 | 70.62 | 64.56 | 89.02 | 43.89 | 62.80 | 33.78 | 64 |
| Mix 6 | 53.11 | 49.03 | 89.10 | 45.06 | 57.71 | 36.90 | 53 |
| Mix 7 | 41.81 | 69.42 | 23.66 | 37.15 | 76.53 | 31.98 | 49 |
| Mix 8 | 25.42 | 18.93 | 96.89 | 34.34 | 56.62 | 25.62 | 33 |
| Mix 9 | 20.34 | 39.81 | 87.03 | 71.31 | 39.43 | 26.99 | 43 |
| Mix 10 | 92.66 | 100.00 | 86.14 | 48.04 | 33.38 | 21.48 | 81 |
| Mix 11 | 45.76 | 44.17 | 28.47 | 56.31 | 31.56 | 32.93 | 44 |
| Mix 12 | 27.12 | 46.12 | 88.59 | 64.00 | 33.16 | 27.74 | 46 |
| Mix 13 | 22.03 | 32.52 | 96.24 | 55.33 | 30.91 | 24.96 | 39 |
| Mix 14 | 58.76 | 36.41 | 90.88 | 36.81 | 65.74 | 30.29 | 50 |
| Mix 15 | 66.10 | 41.75 | 100.00 | 73.63 | 7.98 | 28.24 | 58 |
| Mix 16 | 67.23 | 74.27 | 61.97 | 54.41 | 25.83 | 32.64 | 63 |
| Mix 17 | 16.95 | 0.00 | 79.41 | 60.99 | 15.77 | 0.00 | 24 |
| Mix 18 | 19.21 | 22.82 | 0.00 | 30.20 | 17.67 | 34.07 | 21 |

TABLE 16-continued

Summary of prioritization.

| | | | | | | | |
|---|---|---|---|---|---|---|---|
| Mix 19 | 50.85 | 76.21 | 93.09 | 37.42 | 2.13 | 33.33 | 57 |
| Mix 20 | 100.00 | 65.53 | 82.63 | 50.31 | 100.00 | 94.44 | 79 |
| Mix 21 | 0.00 | 41.26 | 25.49 | 0.00 | 40.23 | 48.89 | 20 |
| 23% NaCl | 73.45 | 69.42 | 16.38 | 29.29 | 94.42 | 98.15 | 61 |
| Beet juice/salt brine blend | 78.53 | 87.86 | 19.72 | 100.00 | 96.95 | 100.00 | 82 |

Based on the priorities set in Table 16, the multi-criteria scoring matrix resulted in Mix-21 having the lowest score (20). Note that six mixtures featured a higher score than 23% NaCl brine control (61) under the investigated conditions and given priorities. Specifically, Mix-10 exhibited the highest score: 81, which is too close to the score of beet juice/salt brine blend (82). In the next step, the obtained scores for each anti-icer listed in Table 16 and the weight percent of each additive listed in Table 13 were used as inputs in Design-Expert® software to obtain the "best performer" sample based on the central composite design method. According to this analysis, the "best performer" sample consisted of 0.89% Concord grape extract, 4.57% glycerin, 4.54% sodium formate, 0.19% sodium metasilicate, and 18.4% NaCl.

Figure 20:
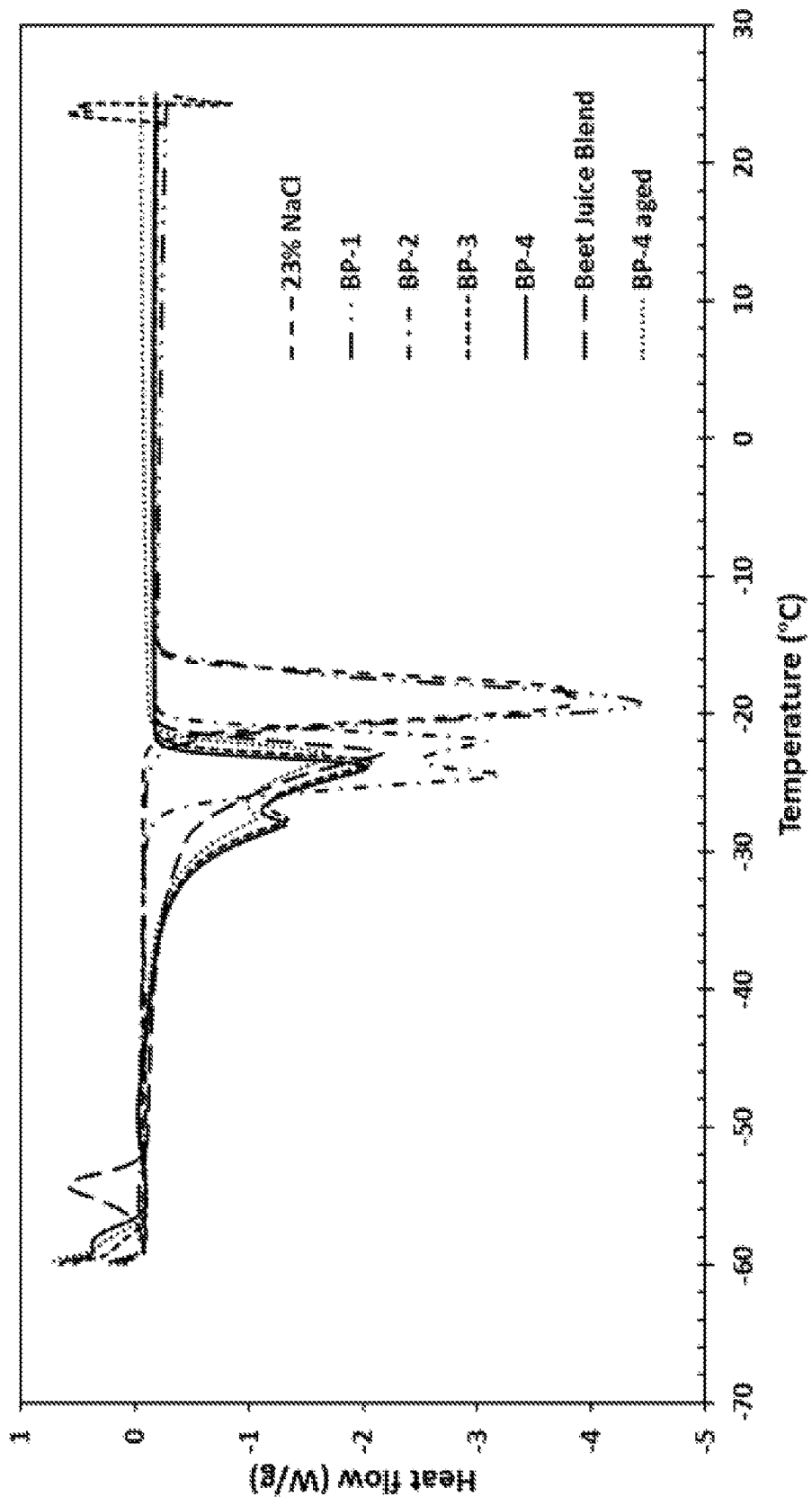
FIG. 20 is a warming cycle DSC thermogram of the characteristic temperatures of various example anti-icers in accordance with the present technology.

FIG. 20 is a warming cycle DSC thermogram of the characteristic temperatures of various example anti-icers in accordance with the present technology. On the horizontal axis is temperature. On the vertical axis is heat flow. The warming cycle DSC thermogram was used for studying the anti-icers, because the warming cycle is less affected by super-cooling effect and is thus more reliable than the cooling cycle thermogram. Six samples plus RP-4 aged were examined; their composition is shown in Table 17.

TABLE 17

Composition of different deicers used to obtain DSC thermograms

| | Weight % of additive in DI water-based solution | | | | |
|---|---|---|---|---|---|
| Sample | Concord grape extract | Glycerin | HCOONa | Na$_2$SiO$_3$ | NaCl |
| Salt brine | | | | | 23 |
| BP-1 | | | | 0.19 | 18.4 |
| BP-2 | | | 4.54 | 0.19 | 18.4 |
| BP-3 | | 4.57 | 4.54 | 0.19 | 18.4 |
| BP-4 | 0.89 | 4.57 | 4.54 | 0.19 | 18.4 |

The DSC (differential scanning calorimetry) thermogram test is a laboratory method used to quantify deicer performance. The test measures the energy necessary to maintain a near-zero temperature difference between the test substance (deicer) and an inert reference material, with the two subjected to an identical temperature program. The heat-flow measurements indicate phase transitions, energy changes, and kinetics. The DSC measurement used in this research required 5-10 mg of the sample, which was sealed in an aluminum capsule, using a heating rate of 2.6° C./min.

For 23% NaCl solution, at around −18.5° C., a drop in heat flow between the sample and air occurred, which corresponds to the phase transition from ice to water. The temperature associated with the lowest (peak) heat flow (−18.4° C.) is defined as the characteristic temperature ($T_C$) of the salt brine sample. The $T_C$ peak relates to the initiation and growth of ice crystals in the test solution. Different chemical solutions would feature thermograms with peaks of unique shape with different values of $T_C$, which is the basis for using a DSC thermogram as the "fingerprint" of the chemical solutions being tested. Tc coincides with the "effective temperature" of the test solution as a deicer, below which temperature ice crystals start to form and the pavement becomes icy.

By adding 0.19 wt. % sodium metasilicate (Na$_2$SiO$_3$) in sample BP-1, the $T_C$ shifted to −19.2° C. Sample BP-2 had a $T_C$ of around −22° C., which showed an almost 2.8° C. decrease in the characteristic temperature due to the addition of 4.54 wt. % sodium formate (HCOONa) to the deicer. Adding 4.57 wt. % glycerin moved the $T_C$ to −23.5° C. Since nearly the same amount of sodium formate and glycerin were used, it can be concluded that sodium formate is a more effective freezing point depressant than glycerin in the examined deicer. Sample BP-4 had a $T_C$ of −23.9° C., which was close to that of Sample BP-3. Therefore, adding 0.89 wt. % Concord grape extract made a minor improvement in the $T_C$. The $T_C$ of the best-performer sample (BP-4) was less than that of the beet juice/salt brine blend, with a $T_C$ of −22.8° C. In addition, the characteristic temperature of BP-4 aged sample was about −23.1° C. which is very close to that of BP-4. This shows that aging has not affected the behavior of the BP-4 sample. It should be mentioned that the aging process for anti-icers is performed at 59° C. for 3 days (72 h) which simulates one-year storage at 24° C. (the temperature inside our lab cabinet).

In the complementary tests, the effect of different constituents of the "best performer" solution was studied by measuring the following properties for BP-1, BP-2, BP-3, BP-4, and BP-4 aged anti-icers.

Figure 21A:
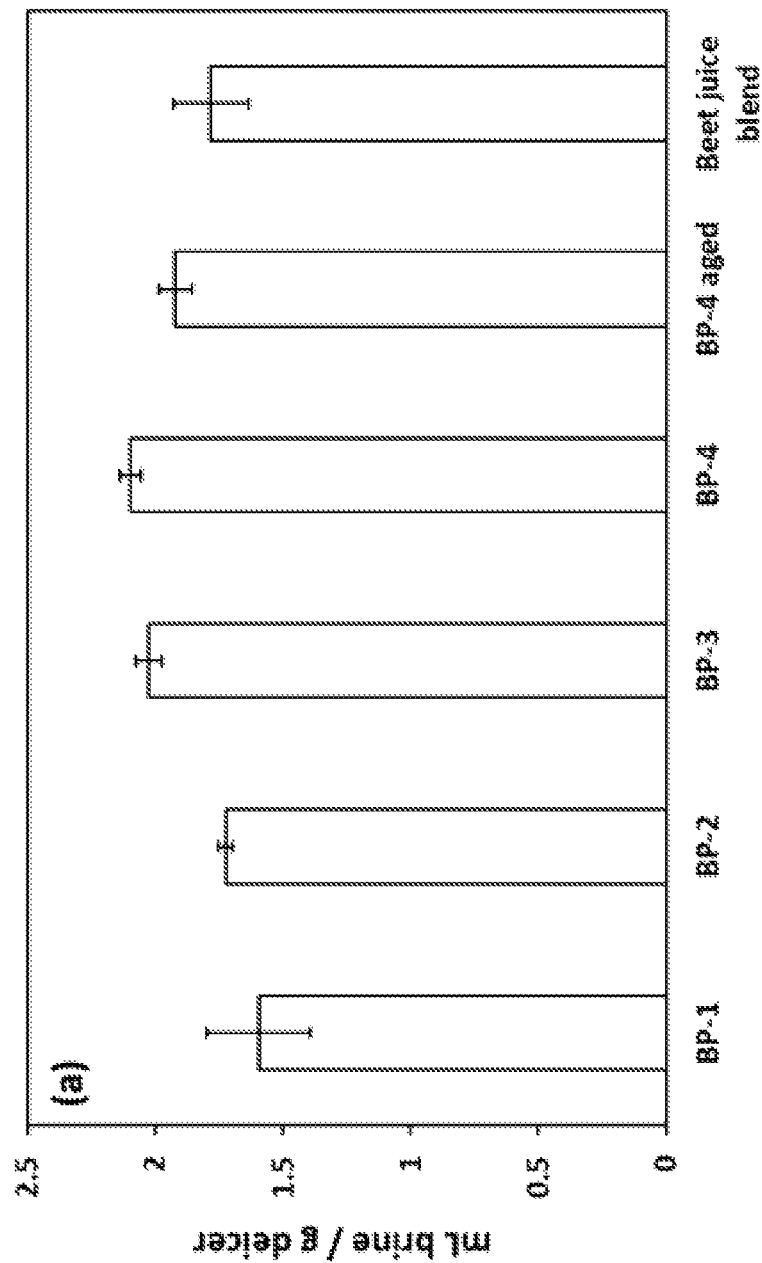
FIG. 21A is a graph of the ice-melting capacity of different anti-icers after 20 minutes in accordance with the present technology.
Figure 21B:
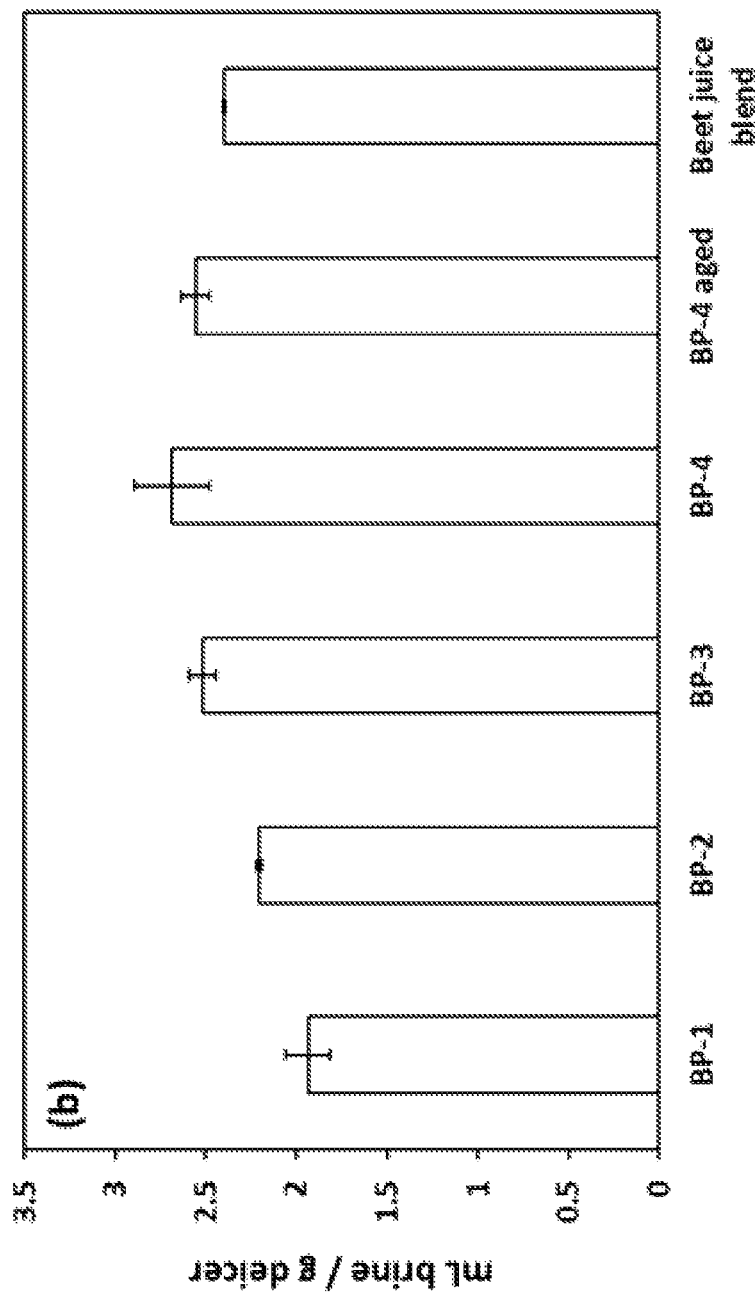
FIG. 21B is a graph of the ice-melting capacity of different anti-icers after 60 minutes in accordance with the present technology.

FIG. 21A is a graph of the ice-melting capacity of different anti-icers after 20 minutes in accordance with the present technology. On the horizontal axis is BP-1, BP-2. BP-3. BP-4, BP-4 (aged), and beet juice blend. On the vertical axis is mL of brine per grams of deicer. FIG. 21B is a graph of the ice-melting capacity of different anti-icers after 60 minutes in accordance with the present technology. On the horizontal axis is BP-1, BP-2. BP-3. BP-4, BP-4 (aged), and beet juice blend. On the vertical axis is mL of brine per grams of deicer.

The results of ice melting test at 20 min and 60 min show that there is an increasing trend on ice melting capacity by adding new additives and as a result, mixture BP-4, which contains all of four additives (sodium metasilicate, sodium formate, glycerin, and Concord grape extract), has the highest ice melting capacity. In addition, it can be seen that the aging process decreased the ice melting capacity of BP-4. However, the aged solution still has higher ice melting capacity than the beet juice/salt brine blend.

For measuring the friction of asphalt pavement, the pavement sample was placed in a conditioning room with the temperature of −9.4° C. and the relative humidity of 80% for overnight. To achieve a 58.8 L/lane-km application rate for anti-icing, a given amount of anti-icer (293 µL) was applied over 182.4 cm$^2$ surface area of the pavement using a pipet in 13 drops (each drop 22.6 µL). After evaporating the water of the applied anti-icer using a dryer, the sample was returned to the conditioning room. Then, it was allowed to stay in the freezer for one hour. After that, to simulate the "black ice" scenario, a given amount of deionized water (728.5 µL) was applied on the surface of sample using a pipet in 13 drops (each drop 56 µL) exactly at the same spots of the applied anti-icer, over a duration of approximately 60 seconds. The mentioned amount of water was chosen as a result of trial and errors, in order to reach a layer of ice on the surface. For simulation of the plowing process, a sharp metallic object was used to level the ice with pavement surface. As a result, a thin layer of ice remained on the surface of the pavement sample. The surface friction was then measured using a static friction tester, which had a 0.64 cm thick, 10.16 cm$^2$ neoprene rubber contact surface (durometer rating of 30 A). The apparatus was pulled horizontally across the pavement surface, and the force needed to overcome static friction was measured with a spring scale. The coefficient of static friction was defined as the ratio of the horizontal pulling force to the weight of the friction tester.

Figure 22:
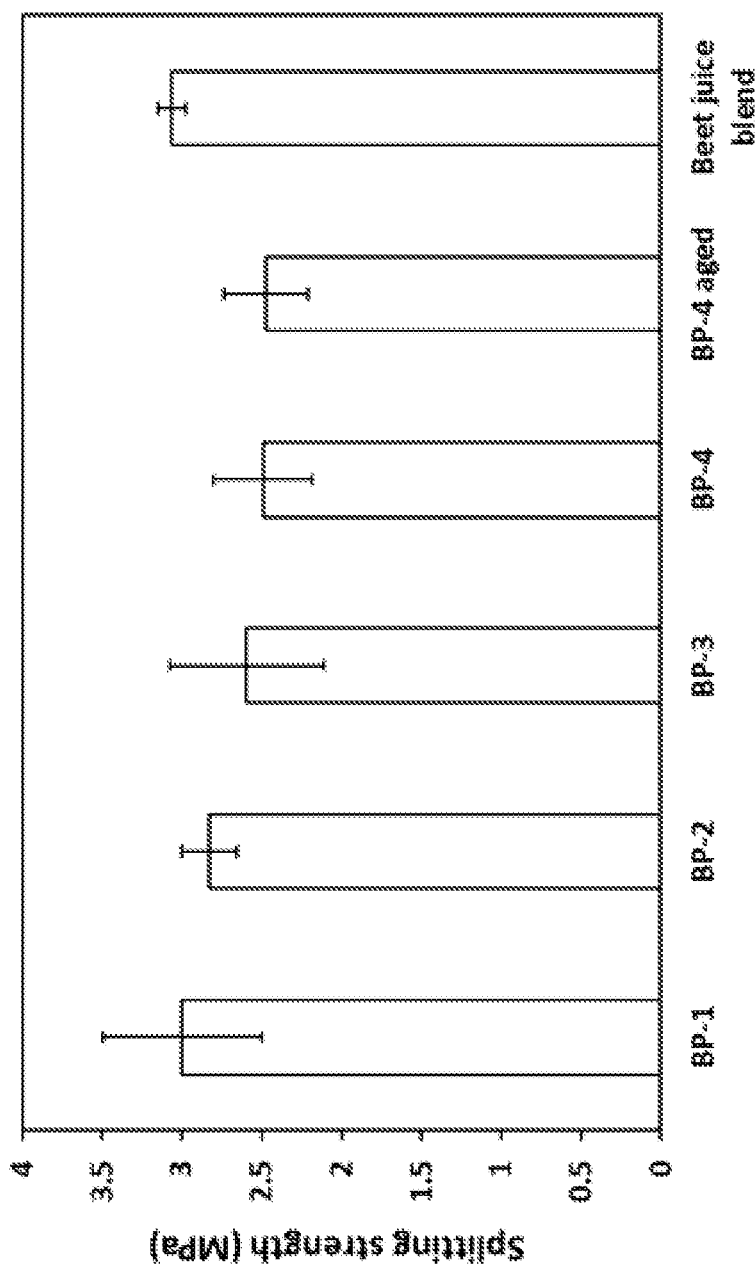
FIG. 22 is a graph of the splitting strength of mortar as a function of various example anti-icers after a 10-cycle freeze-thaw test in accordance with the present technology.

FIG. 22 is a graph of the splitting strength of mortar as a function of various example anti-icers after a 10-cycle freeze-thaw test in accordance with the present technology. On the horizontal axis is BP-1, BP-2. BP-3. BP-4, BP-4 (aged), and beet juice blend. On the vertical axis is splitting strength. In contradiction with the trend seen in ice melting capacity, adding the additives to anti-icer formulation decreased the splitting strength of mortar samples. However, all samples still had more splitting strength than the samples exposed to 23% NaCl (with the mean splitting strength of 2.27 MPa). In addition, aging process did not have any considerable impact on the splitting strength. It is also noteworthy that the splitting strength of the sample exposed to beet juice/salt brine blend was more than BP-4.

Figure 23A:
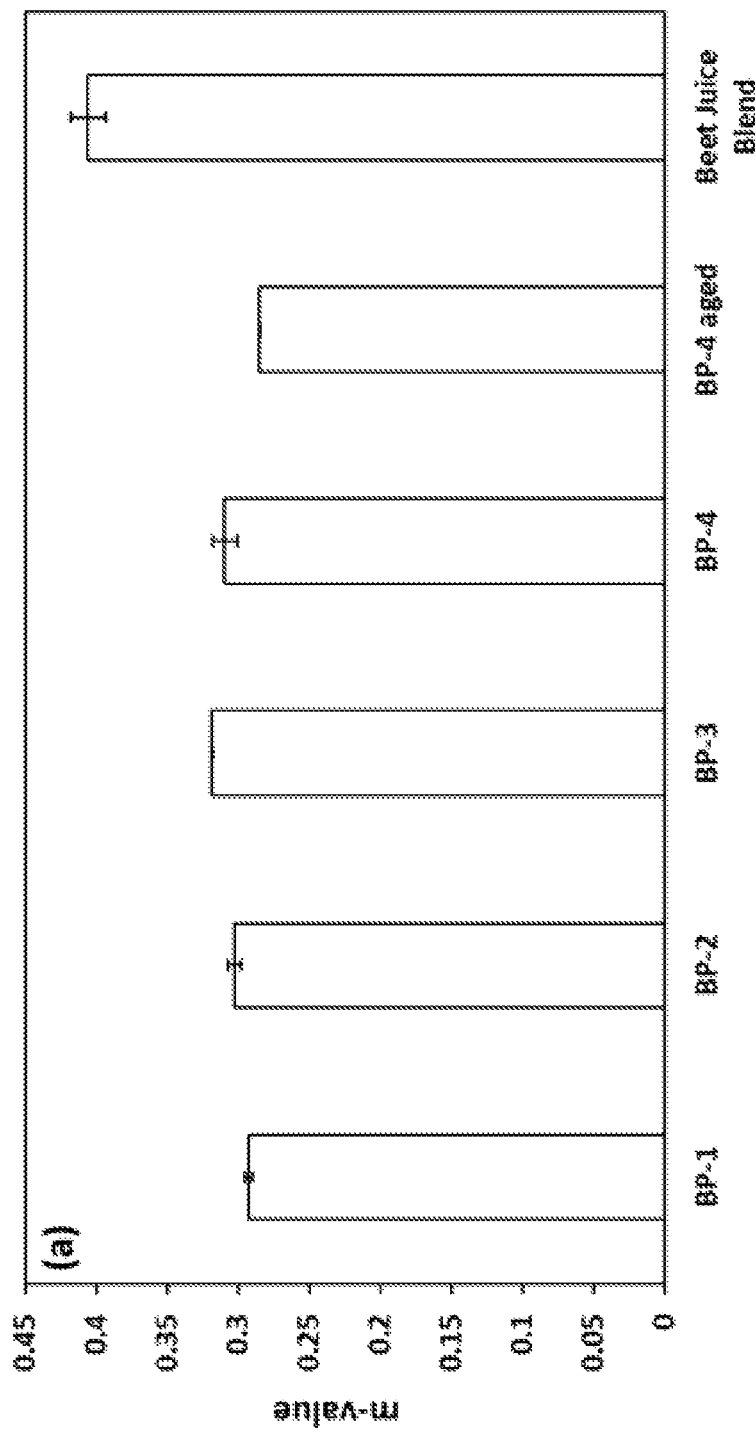
FIG. 23A is a graph of the m-value of an example asphalt binder in accordance with the present technology.
Figure 23B:
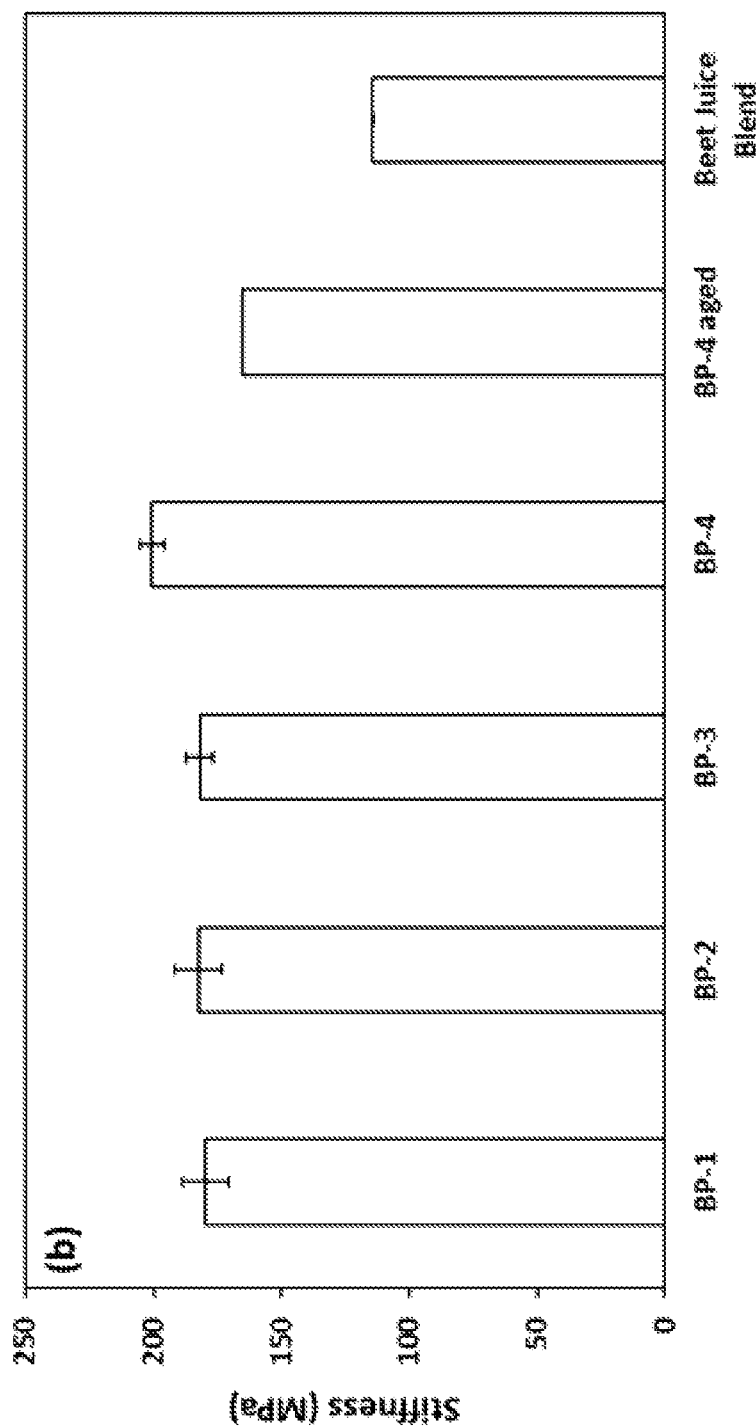
FIG. 23B is a graph of the creep stiffness of an example asphalt binder accordance with the present technology.

FIG. 23A is a graph of the m-value of an example asphalt binder in accordance with the present technology. On the horizontal axis is BP-1, BP-2. BP-3. BP-4, BP-4 (aged), and beet juice blend. On the vertical axis is m-value. FIG. 23B is a graph of the creep stiffness of an example asphalt binder accordance with the present technology. On the horizontal axis is BP-1, BP-2. BP-3. BP-4, BP-4 (aged), and beet juice blend. On the vertical axis is creep stiffness. The low temperature BBR test results for different anti-icers are presented in FIG. 23A-B. It is shown that by adding sodium metasilicate, sodium formate, and glycerin (BP-1 to BP-3), the m-value increased which is good since higher m-value indicates higher ability to relax and thus lower risk of thermal cracking. On the other hand, by adding the grape extract m-value decreased and the aged sample showed even lower m-value. It is also seen that all of the samples have lower m-value compared to the samples exposed to beet juice/salt brine blend.

As mentioned earlier, higher stiffness values correspond to higher thermal stresses and higher risk of thermal cracking. BP-4 showed the highest stiffness that indicates it has the most impact on asphalt binder in terms of increasing the thermal stresses. The aging process on this sample had a positive effect on stiffness of sample. However, the least stiffness belonged to the sample exposed to beet juice/salt brine blend.

Figure 24:
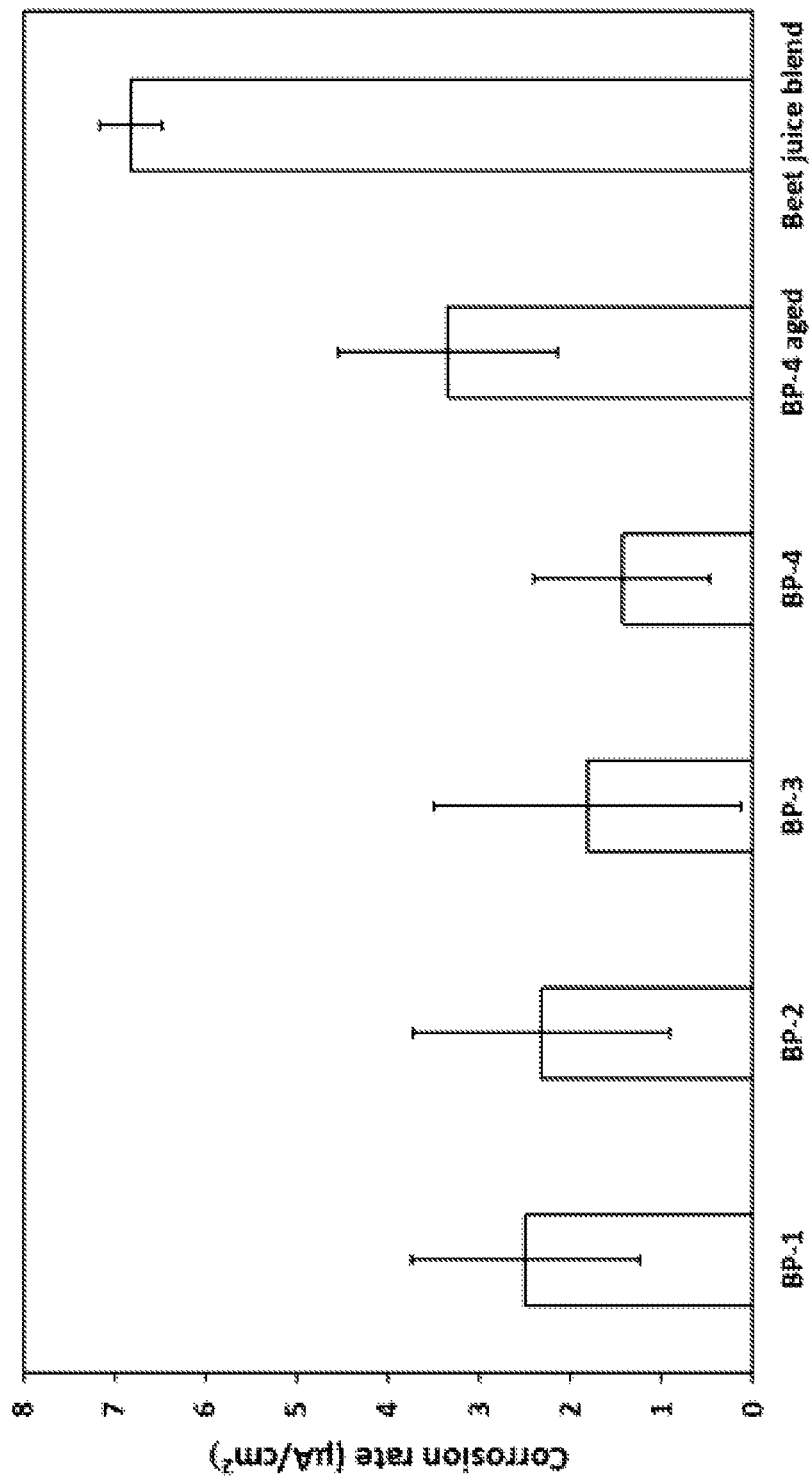
FIG. 24 is a graph of corrosion rates of C1010 carbon steel coupons measured by LPR technique after 24 hours of immersion in different example anti-icer mixtures in accordance with the present technology.

FIG. 24 is a graph of corrosion rates of C1010 carbon steel coupons measured by LPR technique after 24 hours of immersion in different example anti-icer mixtures in accordance with the present technology. On the horizontal axis is BP-1, BP-2. BP-3. BP-4, BP-4 (aged), and beet juice blend. On the vertical axis is corrosion rate. By adding different additives, the corrosion rate has decreased and BP-4 has the best anti-corrosion performance. However, the aging process had a negative effect on its performance, and as a result, the aged BP-4 caused a higher corrosion rate compared to BP-4. It is noteworthy that even the aged BP-4 caused a lower corrosion rate than the beet juice/salt brine blend.

Figure 25:
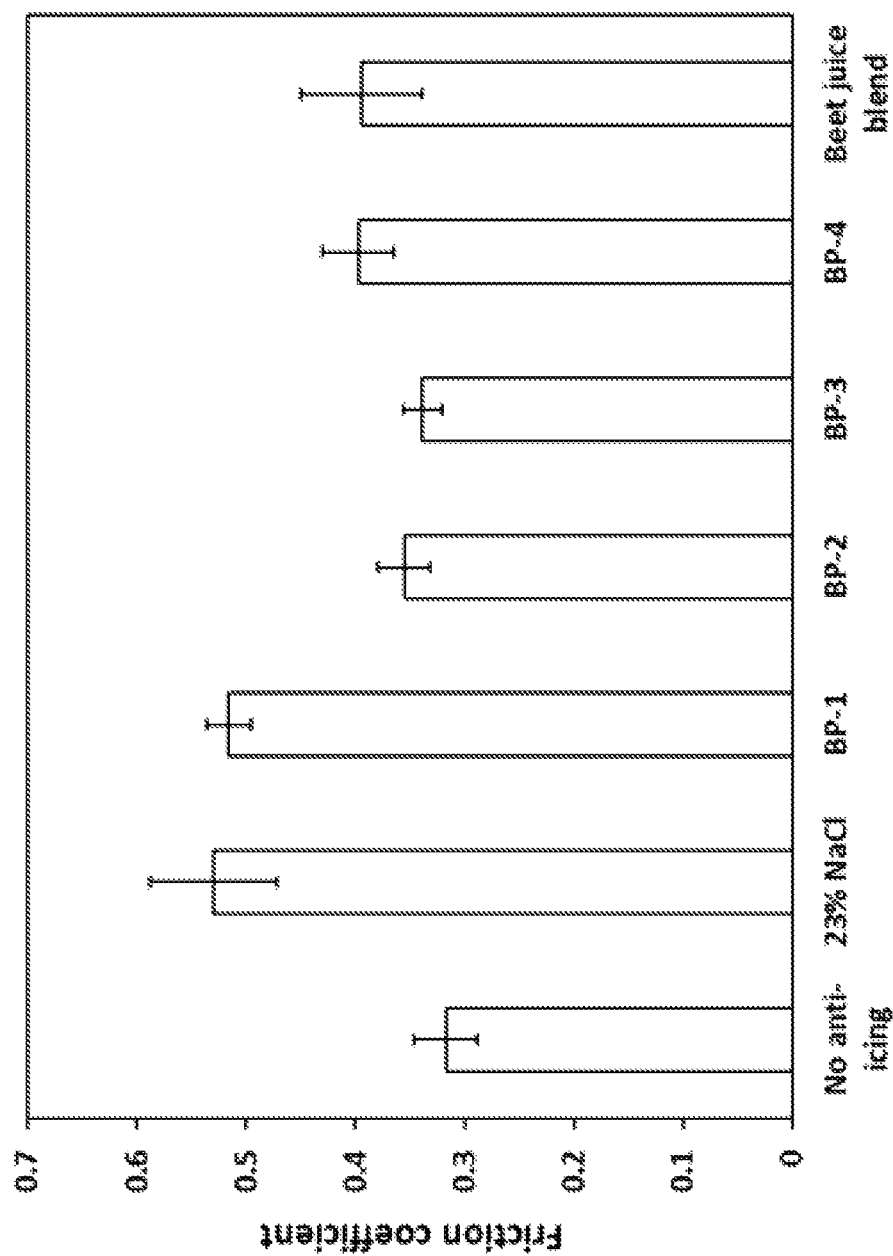
FIG. 25 is a graph of the friction coefficient of iced-asphalt pavement after different anti-icing scenarios in accordance with the present technology.

FIG. 25 is a graph of the friction coefficient of iced-asphalt pavement after different anti-icing scenarios in accordance with the present technology. On the horizontal axis is various deicers: no anti-icing, 23% NaCl, BP-1, BP-2, BP-3. BP-4, and beet juice blend. On the vertical axis is the friction coefficient. FIG. 25 shows the friction coefficient of the asphalt concrete pavement after different anti-icing treatment under the simulated "black ice" scenario. Anti-icing using 23% NaCl solution increased the friction coefficient of the icy asphalt pavement by 67.3%. After adding sodium metasilicate (BP-1), sodium formate (BP-2), and glycerin (BP-3) to the salt brine, the friction coefficient of anti-iced asphalt pavement decreased. However, by adding the Concord grape extract, the friction coefficient increased and became slightly better than the case of anti-iced by the beet juice/salt brine blend. The increase of friction coefficient after adding the grape extract may be due to more contact area induced by the agro-based materials (Waluś and Olszewski 2011), or the weaker microstructure of the ice remaining on the pavement.

The best-performer sample and beet juice/salt brine blend were used for the COD (chemical oxygen demand) test. Both solutions were diluted to a ratio of 1000:1 by adding deionized water. Then 2 mL of the diluted solution was added to COD Standard Solution containing potassium dichromate as a strong oxidizing agent. The mixture was heated at 150° C. for 2 h. After the mixture cooled to room temperature, the mg/L COD was measured at the wavelength of 420 nm using a Genesys 20 spectrophotometer (Thermo Electron Corporation, Waltham, Mass.).

The mg/L COD (chemical oxygen demand) data reflect measures of milligrams of oxygen consumed per liter of sample via the standard procedure mentioned earlier. In measuring the mg/L COD, both solutions were diluted to a ratio of 1000:1 by adding DI (deionized) water. For measuring the pH, original solutions were used. The associated data are presented in Table 18, which shows that the best-performer sample has almost half the COD of the beet juice/salt brine blend. However, the pH of the best-performer sample is twice that of the beet juice/salt brine blend. By increasing the pH value, the COD removal efficiency increases in wastewater systems (Sivrioğlu and Yonar 2015). In fact, in the alkaline condition, a high concentration of OH$^−$ ions can provide oxygen necessary for oxidation of chemicals and can decrease the need for external oxygen.

TABLE 18

Chemical oxygen demand and pH of best-performer sample and beet juice/salt brine blend

| Sample | mg/L COD | pH |
|---|---|---|
| Beet juice/salt brine blend | 277.94 | 5.3 |
| Best performer (BP-4) | 135.17 | 11.7 |

Biochemical oxygen demand (BOD), which is also known as biological oxygen demand, refers to the amount of DO used by aerobic microorganisms to decompose the biodegradable organic matter in a water sample over a specific time (Real Tech Inc. 2017). BOD is a measure of the degree of water pollution in receiving water bodies such as streams and lakes. It takes a long time for microorganisms to degrade the organic matter. Therefore, the most common time periods for BOD are the 5-day oxygen demand ($BOD_5$) and the 20-day oxygen demand ($BOD_{20}$).

The "best performer" anti-icer and beet juice/salt brine blend were used for BOD (biochemical oxygen demand) test. For sample dilution, 45 mL of each sample was measured in a graduated cylinder. It was then transferred to a BOD bottle with the total volume of 300 mL. The remaining volume of the BOD bottle was filled with aerated dilution water. For calculating the dilution factor, the dilution volumes were recorded. Same dilution procedure was repeated three times for each sample. In addition, three bottles just filled with aerated dilution water were used as control. After measuring $DO_0$ (t=0) using a calibrated dissolved oxygen (DO) meter, the bottles were labeled and placed in the 20° C. incubator for 5 days. At day-five, the DO was measured in the incubated bottles using the DO meter ($DO_5$). The $BOD_5$ was calculated using following equation.

$$BOD_5\left(\frac{mg}{L}\right) = \frac{DO_0 - DO_5}{P} \quad (1)$$

Where, $DO_0$ and $DO_5$ are dissolved oxygen concentrations (mg/L) at t of 0 and 5 days. P is the decimal volumetric fraction of sample used (dilution fraction) which is 0.15.

In the next step, the same process shown in Table 16 for prioritizing the solutions was used again for the samples of BP-4, 23% NaCl, and beet juice/salt brine blend, by considering the friction coefficient as a new parameter which is as important as ice melting capacity. As a result, the following scores were obtained for the mentioned solutions respectively: 59, 31, and 34. This shows that BP-4 with score of 59 performs better than 23% NaCl with score of 31 and beet juice/salt brine blend with score of 34.

The $BOD_5$ data for the "best performer" sample, beet juice/salt brine blend, and the control are presented in Table 19, which shows that the best-performer sample has much less $BOD_5$ (0.77 mg/L), substantially lower than the beet juice/salt brine blend ($BOD_5$ of 25.82 mg/L). This shows the significant advantage of the produced anti-icer over the traditional beet juice/salt brine blend in terms of lower risk to water bodies receiving the deicer-laden runoff.

TABLE 19

Biochemical oxygen demand of "best performer" sample, beet juice/salt brine blend, and control.

| Sample | mg/L $BOD_5$ |
|---|---|
| Beet juice/salt brine blend | 25.82 |
| Best performer (BP-4) | 0.77 |
| Control | 0.15 |

Example 3: Apple Pomace

Figure 26:
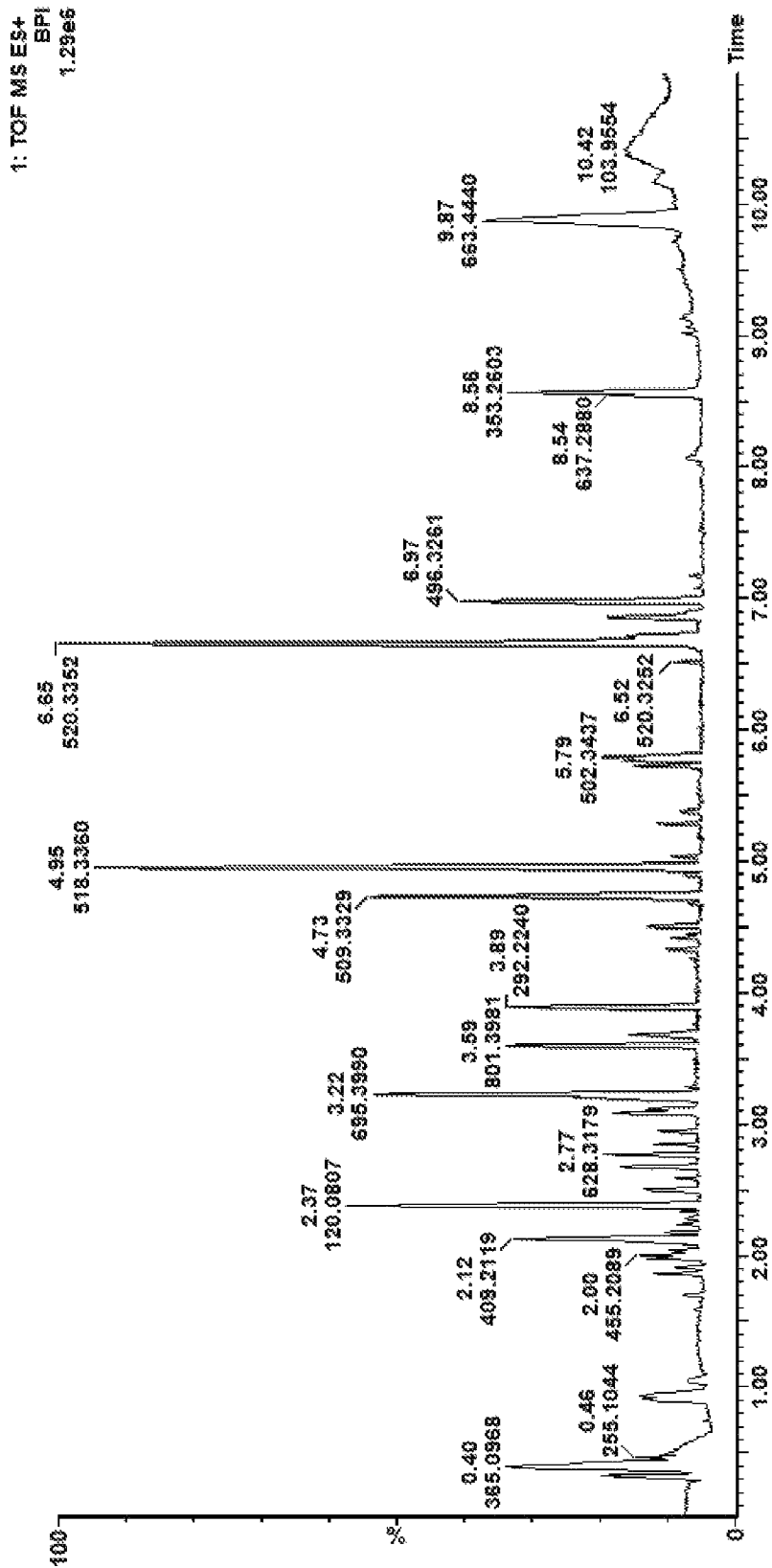
FIG. 26 is an FTIR spectra for an example apple and pomace extract in accordance with the present technology.

FIG. 26 is an FTIR spectra for apple and pomace extracts in accordance with the present technology. On the horizontal axis is time. On the vertical axis is percent. Peaks are shown, indicating that apple pomace extract also include amines linked to de-icing properties.

LC-MS analysis was conducted on apple and pomace extracts to determine their ability as anti-icers. The result of the LC-MS analysis (using the methods previously described) is presented in Table 20.

TABLE 20

Chemical constituents identified for apple pomace extract using LC-MS analysis.

| Formula | Retention time (min) | m/z | wt. % |
|---|---|---|---|
| $C_{16}H_{14}F_2N_4O_4$ | 0.40 | 365.0968 | 7.0 |
| $C_3H_4N_2NaO_2^+$ | 2.37 | 120.0807 | 9.4 |
| $C_{32}H_{54}N_8O_9$ | 3.22 | 695.3990 | 10.4 |
| $C_{40}H_{54}N_8O_{11}$ | 3.59 | 801.3981 | 4.4 |
| $C_{31}H_{44}N_2O_4$ | 4.73 | 509.3329 | 7.5 |
| $C_{31}H_{43}N_5O$ | 4.95 | 518.3360 | 17.3 |
| $C_{31}H_{41}N_5O$ | 5.79 | 502.3437 | 3.1 |
| $C_{26}H_{50}NO_7P$ | 6.65 | 520.3352 | 19.3 |
| $C_{27}H_{41}N_7O_2$ | 6.97 | 496.3261 | 7.0 |
| $C_{17}H_{32}N_6O_2$ | 8.56 | 353.2603 | 4.9 |
| $C_{42}H_{63}O_4P$ | 9.87 | 663.4440 | 9.7 |

Like sugar beet leaf extract, apple and pomace extract contains $C_{42}H_{63}O_4P$. The apple pomace extract also contains $C_{26}H_{50}NO_7P$, 1-Linoleoyl-sn-glycero-3-phosphocholine, which can work as an effective corrosion inhibitor in that it adsorbs onto the steel surface to form a barrier layer and serve as a blocker of active anodic sites. All of these possible structures contain phosphate ion, so, it can be concluded that phosphate is one of the apple and pomace extract components.

Example 4: Blueberry Extract

LC-MS analysis was conducted on blueberry extracts to determine their ability as anti-icers. The result of the LC-MS analysis (using the methods previously described) is presented in Table 21.

TABLE 21

Chemical constituents detected for Blueberry extract using LC-MS technique.

| Formula | Retention time (min) | m/z |
|---|---|---|
| $C_7H_{17}O_4P$ | 0.68 | 197.0954 |
| $C_9H_{11}NO_4$ | 1.35 | 198.0771 |
| $C_{18}H_{32}N_4O_5$ | 2.37 | 385.2467 |
| $C_{31}H_{53}N_7O_8$ | 2.62 | 652.4039 |

TABLE 21-continued

Chemical constituents detected for Blueberry extract using LC-MS technique.

| Formula | Retention time (min) | m/z |
|---|---|---|
| $C_{31}H_{53}N_7O_{10}$ | 2.77 | 684.3956 |
| $C_{37}H_{55}N_7O_{10}$ | 3.26 | 758.4103 |
| $C_{18}H_{33}NO_3$ | 3.81 | 312.2506 |
| $C_{17}H_{30}N_3P$ | 3.93 | 308.2218 |
| $C_{16}H_{28}N_6O_3$ | 4.47 | 353.2297 |
| $C_{18}H_{28}O_2$ | 6.37 | 279.2339 |
| $C_{30}H_{46}O_2$ | 8.12 | 439.3552 |
| $C_{29}H_{48}O_{15}$ | 8.60 | 637.3067 |
| $C_{17}H_{32}N_6O_2$ | 8.64 | 353.2625 |
| $C_{21}H_{39}F_3O_2$ | 9.42 | 381.2986 |

While blueberry extracts do not contain similar de-icing component seen in sugar beet leaves and apple pomace, the LC-MS results still show the presence of molecules that feature benefits to corrosion inhibition and de-icing properties, like that in dandelion leaves described above.

Example 5: Cherry Extract

LC-MS analysis was conducted on cherry extracts to determine their ability as anti-icers. The result of the LC-MS analysis (using the methods previously described) is presented in Table 22.

TABLE 22

Chemical constituents detected for Cherry extract using LC-MS technique.

| Formula | Retention time (min) | m/z | wt. % |
|---|---|---|---|
| $C_{16}H_{14}F_2N_4O_4$ | 0.40 | 365.0968 | 7.0 |
| $C_3H_4N_2NaO_2^+$ | 2.37 | 120.0807 | 9.4 |
| $C_{32}H_{54}N_8O_9$ | 3.22 | 695.3990 | 10.4 |
| $C_{40}H_{54}N_8O_{11}$ | 3.59 | 801.3981 | 4.4 |
| $C_{31}H_{44}N_2O_4$ | 4.73 | 509.3329 | 7.5 |
| $C_{31}H_{43}N_5O$ | 4.95 | 518.3360 | 17.3 |
| $C_{31}H_{41}N_5O$ | 5.79 | 502.3437 | 3.1 |
| $C_{26}H_{50}NO_7P$ | 6.65 | 520.3352 | 19.3 |
| $C_{27}H_{41}N_7O_2$ | 6.97 | 496.3261 | 7.0 |
| $C_{17}H_{32}N_6O_2$ | 8.56 | 353.2603 | 4.9 |
| $C_{42}H_{63}O_4P$ | 9.87 | 663.4440 | 9.7 |

Like apple and pomace extract, cherry extract also contains $C_{42}H_{63}O_4P$. The possible structures for this compound are Tris[2,4-bis(2-methylpropyl)phenyl] phosphate or Tris [4-(1,1,3,3-tetramethylbutyl)phenyl] phosphate or Tris(2,4-ditert-butylphenyl)phosphate. All of these possible structures contain phosphate ions, so, it can be concluded that phosphate is one of the cherry extract components.

While illustrative embodiments have been illustrated and described, it will be appreciated that various changes can be made therein without departing from the spirit and scope of the invention.

The embodiments of the invention in which an exclusive property or privilege is claimed are defined as follows:

1. A deicing formulation, comprising:
a chemically degraded extract derived from biowaste has a molecular structure of $C_XH_YO_ZP_UN_V$, where the number of C atoms (X), H atoms (Y), O atoms (Z), P atoms (U), and N atoms (V) falls in the ranges of 4 to 42, 5 to 63, 2 to 15, 0 to 1, and 0 to 8, respectively; and
a salt.

2. The deicing formulation of claim 1, wherein the biowaste is selected from the group of waste leaves of flowers; vegetation; vegetables; shrubs, pomace, rind or skin of fruits; and combinations thereof.

3. The deicing formulation of claim 1, wherein the chemically degraded extract derived from biowaste is present in an amount from 0.5-16%, by weight.

4. The deicing formulation of claim 1, wherein the salt is a chloride salt.

5. The deicing formulation of claim 1, wherein the salt is NaCl, KCl, $MgCl_2$, $CaCl_2$, or any combination thereof.

6. The deicing formulation of claim 1, wherein the chemically degraded extract is chemically degraded using a degradant selected from urea, NaOH, KOH, LiOH, bacteria, fungus, and combinations thereof.

7. The deicing formulation of claim 1, wherein the deicing formulation is a liquid deicing formulation.

8. The deicing formulation of claim 7, wherein the liquid deicing formulation comprises water or liquid waste from distillery industry.

9. The deicing formulation of claim 7, wherein the liquid deicing formulation is configured to prewet a solid surface.

10. The deicing formulation of claim 9, wherein the solid surface is selected from solid deicer, solid salt, traction abrasive, a transportation surface for vehicles, a transportation surface for pedestrians.

11. The deicing formulation of claim 7, wherein the liquid deicing formulation is configured to perform an action selected from: preventing a bond of snow and ice; breaking a bond between compacted snow and ice with a solid surface; reducing the likelihood of snow being compacted into hard-to-remove conditions; reducing the bounce-and-scatter, and speed up the action of winter traction salt or sand; and combinations thereof.

12. A method of preventing ice formation or removing ice from a surface, comprising applying the deicing formulation of claim 1 to the surface.

13. The method of claim 12, wherein the deicing formulation is applied in a liquid deicing formulation.

14. The method of claim 13, wherein the liquid deicing formulation is configured to prewet the surface.

15. The method of claim 14, wherein the surface is selected from solid deicer, solid salt, traction abrasive, a transportation surface for vehicles, and a transportation surface for pedestrians.

16. The method of claim 12 wherein the biowaste of the chemically degraded extract derived from biowaste is selected from the group of waste leaves of flowers; vegetation; vegetables; shrubs; pomace, rind or skin of fruits; and combinations thereof.

17. The method of claim 12, wherein the salt is a chloride salt.

\* \* \* \* \*